(12) United States Patent
Chu

(10) Patent No.: US 12,259,371 B2
(45) Date of Patent: Mar. 25, 2025

(54) CARRIER GAS CONNECTION DEVICE FOR GAS CHROMATOGRAPHS

(71) Applicant: AGILENT TECHNOLOGIES, INC., Santa Clara, CA (US)

(72) Inventor: Bo Chu, Shanghai (CN)

(73) Assignee: Agilent Technologies, Inc., Santa Clara, CA (US)

( * ) Notice: Subject to any disclaimer, the term of this patent is extended or adjusted under 35 U.S.C. 154(b) by 636 days.

(21) Appl. No.: 17/294,559

(22) PCT Filed: Nov. 16, 2018

(86) PCT No.: PCT/CN2018/115823
§ 371 (c)(1),
(2) Date: May 17, 2021

(87) PCT Pub. No.: WO2020/097899
PCT Pub. Date: May 22, 2020

(65) Prior Publication Data
US 2022/0011279 A1  Jan. 13, 2022

(51) Int. Cl.
*G01N 30/38* (2006.01)
*G01N 30/02* (2006.01)

(52) U.S. Cl.
CPC ....... *G01N 30/38* (2013.01); *G01N 2030/025* (2013.01)

(58) Field of Classification Search
CPC .. G01N 30/20; G01N 30/38; G01N 2030/385; G01N 2030/202; G01N 2030/025
See application file for complete search history.

(56) References Cited

U.S. PATENT DOCUMENTS

| 3,119,251 A | 1/1964 | Bowers |
| 3,150,517 A | 9/1964 | Kuffer et al. |
| 3,537,297 A * | 11/1970 | Ayers .................. G01N 30/468 73/23.35 |

(Continued)

FOREIGN PATENT DOCUMENTS

| CN | 101300486 A | 11/2008 |
| CN | 101641596 A | 2/2010 |

(Continued)

OTHER PUBLICATIONS

Agilent Technologies, Inc. (2017). Agilent 490 Micro Gas Chromatograph: User Manual. 134 pages. Retrieved from https://www.agilent.com/cs/library/usermanuals/public/G3581-90001.pdf.

(Continued)

*Primary Examiner* — Paul M. West

(57) ABSTRACT

Carrier gas connection devices (100, 402, 404, 406, 408) enable one to change the carrier gas provided to a gas chromatography channel. The carrier gas connection devices (100, 402, 404, 406, 408) comprise a channel adaptor (102, 202), a carrier block (104, 302), and a clamping system, and two or more channel adaptor positions. In each of the channel adaptor positions, a fluid-tight flow path for carrier gas out of the carrier block (104, 302) into the channel adaptor (102, 202) is formed. Carrier gas distribution systems (400), gas chromatography instruments, and methods of changing a carrier gas supplied to a GC are also provided.

20 Claims, 13 Drawing Sheets

(56) References Cited

U.S. PATENT DOCUMENTS

| | | | |
|---|---|---|---|
| 3,910,765 | A | 10/1975 | Tinklepaugh et al. |
| 4,119,120 | A | 10/1978 | Mehaffy et al. |
| 5,338,514 | A | 8/1994 | Morabito et al. |
| 5,340,543 | A | 8/1994 | Annino et al. |
| 5,567,868 | A | 10/1996 | Craig et al. |
| 6,004,514 | A | 12/1999 | Hikosaka et al. |
| 6,029,499 | A | 2/2000 | Sittler et al. |
| 8,480,970 | B2 | 7/2013 | Kawazoe et al. |
| 8,871,149 | B2 | 10/2014 | Zilioli et al. |
| 8,882,894 | B2 | 11/2014 | Pelagatti et al. |
| 2002/0127146 | A1 | 9/2002 | Bergh et al. |
| 2016/0084404 | A1 | 3/2016 | Gabrys |

FOREIGN PATENT DOCUMENTS

| | | |
|---|---|---|
| CN | 206788121 U | 12/2017 |
| DE | 19843942 C1 | 3/2000 |
| JP | S58208661 A | 12/1983 |
| JP | H11173957 A | 7/1999 |
| JP | 2000180414 A | 6/2000 |
| JP | 2016516182 A | 6/2016 |
| WO | 2007028130 A2 | 3/2007 |

OTHER PUBLICATIONS

Agilent Technologies, Inc. (2010). Agilent 7693A Automatic Liquid Sampler: Installation, Operation and Maintenance. 260 pages. Retrieved from https://www.agilent.com/cs/library/usermanuals/public/G4513-90010.pdf.

Agilent Technologies, Inc. (2017) Agilent G3969A Transfer Line Interface for an Agilent 7697A HS Accessory: For the Agilent Intuvo 9000 Gas Chromatograph Installation Instructions. 20 pages. Retrieved from https://www.agilent.com/cs/library/usermanuals/public/G3969-90010.pdf.

Agilent Technologies, Inc. (2007). Installing an Auxiliary Pressure Control Module: Agilent 6850 GCs, Accessory G3349B. 16 pages. Retrieved from https://www.agilent.com/cs/library/usermanuals/Public/G3349-90008(clr)_050019.pdf.

Hewlett Packard Company. (1998). Installing the Flame Ionization Detector EPC Flow Control Manifold. 8 pages. Retrieved from https://www.agilent.com/cs/library/usermanuals/public/G1531-60525.pdf.

International Search Report and Written Opinion mailed on Aug. 7, 2019, International Application No. PCT/CN2018/115823, 11 pages.

Valco Instruments Co. Inc. and VICI AG International. (2019). Valco Injectors and Selectors: Valco Injectors and Valves for Gas Chromatography. 1 page. Retrieved from https://www.vici.com/vval/wval_gc.php.

EPO, "Extended European Search Report mailed on May 25, 2022," Application No. 18940311.6, 8 pages.

* cited by examiner

CARRIER GAS CONNECTION DEVICE FOR GAS CHROMATOGRAPHS

CROSS-REFERENCE TO RELATED APPLICATIONS

None.

FIELD OF THE INVENTION

The present disclosure relates generally to devices for providing carrier gas to a gas chromatograph and to methods of changing the carrier gas provided to a gas chromatography channel.

BACKGROUND OF THE INVENTION

Gas chromatographs (GC) can analyze a gas, liquid, or solid sample by separating the constituents of the sample and producing a signal that indicates the amount and type of analyte in the sample. A sample is injected into the inlet of the GC, either manually or using a sampling device. The sample, if not already in the gaseous state, is vaporized in the inlet, carried through a heated GC column containing a stationary phase that separates the analytes, and exits through the detector which produces a signal indicative of the amount and type of analyte in the sample. A carrier gas moves the sample through the GC flow path. A flow control module can be used to control the flow of carrier gas. The flow control module can be connected to the injector and/or inlet. The flow of carrier gas can be controlled directly or indirectly, for example by knowing the fluidic restriction in the GC flow path and controlling the pressure at the head of the column or other locations along the flow path. Additional flow control modules may supply gases to the detector or elsewhere along the flow path. Typical carrier gases used in gas chromatography include helium, hydrogen, nitrogen, and a mixture of argon and methane. Typical column flow rates vary from 0.5 ml/min to 20 ml/min, while pressures are typically in the range of vacuum to 150 psi. A gas chromatograph can contain one or more columns, inlets, and/or detectors. In a GC, a channel refers to the components that make up a single flow path of a sample through a column, such as from sample injection to exiting of the sample from the detector or detectors to the atmosphere or waste. A GC can have multiple channels that analyze samples in parallel or serially.

Gas chromatographs are available in various scales and configurations, including but not limited to laboratory GCs, mobile GCs, and micro GCs. Micro gas chromatographs are low-power, compact GC instruments that can be transported to a site to analyze a sample. A micro GC will typically contain one or more analysis channels constructed as individual, interchangeable modules which include an injector, a column assembly, a detector, and other components. Each analysis channel typically also contains a flow control module to control the flow of carrier gas and sample through the components of the channel.

Gas chromatographs are typically connected to a carrier gas source(s) via the flow control module. A carrier gas source may be a pressurized tank or canister that is external or internal to the GC instrument or a supply of pressurized gas from a panel external to the instrument, typically a gas distribution system in a laboratory. If a gas chromatograph has more than one channel, there may be a desire to use different carrier gases for each channel depending on the analyses being performed. Typically, methods of distributing the carrier gas to the flow control modules involve manually cutting and routing tubing to each of the flow control modules and attaching it using traditional ferrule-nut connections. If a user wishes to supply a different carrier gas to the GC or to a channel, it generally involves disconnecting a fluid-tight connection with one carrier gas source and eliminating connectors and tubing and making a new fluid-tight connection with the different carrier gas source by measuring, cutting, routing, and connecting tubing. This can be a manual, time-consuming process that is prone to mistakes in routing the tubing from the carrier gas source to the correct channels and leaks resulting from making and breaking nut-ferrule connections. For GCs that contain more than one channel, the difficulty and efforts in making fluid-tight connections are multiplied by the number of channels. Additionally, if a user wants to remove a channel from a GC or temporarily take a channel out of use, they may have to eliminate tubing and connections from the carrier gas lines that went to that channel.

In a micro GC, a pump is used to assist in drawing the sample into the injector to inject a precise amount of sample onto the column. Tubing is used to connect the channel to a pump and, if the analysis allows, multiple channels may share a single pump. For example, if the same sample is being analyzed by more than one channel, the amount being injected for each channel is the same, and the same carrier gas is used, those channels can share a pump. As the pump is pulling sample into the sample loop, excess sample gas vents out of this tubing and through the pump. This waste (or vent gas) consists of sample in gaseous form. These vent gas conduits are part of a system separate from carrier gas delivery. This also requires routing of tubing from each channel to the pump or pumps and connecting and disconnecting tubing when channels are installed or removed, particularly in the case when channels share a pump. Generally, this tubing is plastic tubing connected with fittings.

SUMMARY OF THE INVENTION

As an aspect of the invention, a carrier gas connection device is provided. The carrier gas connection device comprises a carrier block comprising a plurality of carrier block carrier gas passageways, such as first and second carrier block carrier gas passageways, and each of the carrier block carrier gas passageways comprises an entrance and exit. Each of these entrances is fluidically connected directly or indirectly to a carrier gas source. Each of these exits can be located in a recess and/or surrounded by a compliant seal material. The carrier gas connection device also comprises a channel adaptor, and it comprises a channel adaptor carrier gas passageway having an entrance and an exit. This channel adaptor carrier gas passageway exit is fluidically connected directly or indirectly to a GC channel, such as to the flow control module of the GC channel. The carrier gas connection device also comprises a clamping system that clamps the channel adaptor to the carrier block in a substantially fluid-tight connection, so that carrier gas can flow from exits of the carrier block carrier gas passageways into the entrance of the channel adaptor carrier gas passageway. In some embodiments, the carrier gas connection device comprises two or more channel adaptor positions, and in each of the channel adaptor positions, the channel adaptor carrier gas passageway entrance aligns with one of the carrier block carrier gas passageway exits to form a fluid-tight flow path for carrier gas out of the carrier block into the channel adaptor, while the other carrier block carrier gas passageway exit is plugged by a sealing surface of the channel adaptor.

For example, the carrier gas connection device can comprise first and second channel adaptor positions wherein: (i) in the first channel adaptor position, the channel adaptor carrier gas passageway entrance aligns with the first carrier block carrier gas passageway exit to form a fluid-tight flow path for a first type of carrier gas out of the carrier block into the channel adaptor, and (ii) in the second channel adaptor position, the channel adaptor carrier gas passageway entrance aligns with the second carrier block carrier gas passageway exit in the second channel adaptor position to form a fluid-tight flow path for a second type of carrier gas out of the carrier block into the channel adaptor.

In some embodiments, the carrier gas connection device also has components for vent gas flowing from the GC channel(s) to the sample pump(s). In some embodiments, the carrier block can also comprise at least one carrier block vent passageway. The entrance to the carrier block vent passageway can be located in a recess and/or surrounded by a compliant seal material. The carrier block vent passageway entrance can be on the same face of the carrier block as the carrier block carrier gas passageway exits (e.g., an inner face). The carrier block vent passageway also comprises an exit. The exit can be fluidically connected to a pump. For example, the pump may be a pump that draws sample into the sample loop of an injector, but then needs to dispose of excess sample. The excess sample from the injector in the GC channel may be directed to the carrier gas connection device, entering through the channel adaptor fluidically connected to the GC channel and exiting through the carrier block. The carrier block vent passageway exit can comprise a connector configured for insertion to a conduit. Conduits can be integral with the carrier block vent passageways, or permanently attached, or removably attached.

As another aspect of the invention, a carrier gas distribution system is provided. The system comprises a plurality (such as two, three, or more) of the carrier gas connection devices as described herein. For instance, the carrier gas distribution system may comprise a first carrier gas connection device and a second carrier gas connection device. The first carrier block carrier gas passageway of each of the carrier gas connection devices can be fluidically connected to a single first carrier gas source, and/or the second carrier block carrier gas passageway of each of the carrier gas connection devices can be fluidically connected to a single second carrier gas source. The channel adapter of each of the carrier gas connection devices can be fluidically connected to a GC channel.

As yet another aspect of the present invention, a gas chromatography instrument is provided. The GC instrument comprises a gas chromatography channel, which is fluidically connected directly or indirectly to the channel adaptor of a carrier gas connection device as described herein. For example, a GC instrument may comprise at least four GC channels (or a greater or lesser number), where each of the GC channels is fluidically connected to a different one of the carrier gas connection devices through its channel adaptor.

As another aspect of the present invention, a method of changing a carrier gas supplied to a GC channel is provided. The GC instrument comprises one or more of the carrier gas connection devices described herein, and the carrier gas connection device(s) is configured to supply carrier gas to a GC channel(s). The method comprises supplying a first carrier gas to the GC channel, wherein the first carrier gas flows through a carrier gas passageway of a channel adaptor fluidically connected directly or indirectly to the GC channel. The method also comprises moving the channel adaptor from a first channel adaptor position to a second channel adaptor position. The method also comprises supplying a second carrier gas to the GC channel, wherein the second carrier gas flows through the same channel adaptor carrier gas passageway directly or indirectly to the GC channel. Clamping the channel adaptor in the second channel adaptor position can simultaneously form a fluid-tight connection between the second carrier block carrier gas passageway and the channel adaptor carrier gas passageway, and a fluid-tight plug between the first carrier block carrier gas passageway and a sealing surface of the channel adaptor.

Various embodiments of the present carrier gas connection devices provide one or more advantages or features, including but not limited to enabling a user to quickly and easily change the carrier gas provided to a gas chromatography channel. By moving a channel adaptor between different channel adaptor positions, the user can change the carrier gas provided to a GC channel through the carrier gas connection device. Another advantage is provided by enabling a user to change the carrier gas by manual movement of the channel adaptor, which is less expensive than using an actuated valve and therefore desirable. In some embodiments, when the channel adaptor makes a fluidic connection with the carrier block carrier gas passageway to be used, the unused carrier block carrier gas passageway is automatically plugged to avoid spilling into the atmosphere of the carrier gas not being used for that channel. Another feature or advantage is that one can easily switch the type of carrier gas and connect the vent path for a channel with one clamping operation, minimizing leaks and incorrect routing of gases.

These and other features and advantages of the present devices and methods will be apparent from the following detailed description, in conjunction with the appended claims.

The present teachings are best understood from the following detailed description when read with the accompanying drawing figures. The features are not necessarily drawn to scale.

DETAILED DESCRIPTION

In view of this disclosure, it is noted that the devices and methods can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

The carrier gas connection devices are configured to receive carrier gases in carrier block carrier gas passageways and to pass a carrier gas through a channel adaptor carrier gas passageway to a GC channel of the GC instrument. The channel adaptor is attached to the carrier block by use of a clamping system, and the connection device is configured so that fluid-tight seals and/or plugs are formed when the channel adaptor carrier gas passageway and/or sealing surfaces and the carrier block carrier gas passageways are aligned and the clamping system is in place. If the channel adaptor and the carrier block also comprise vent passageways, channel adaptor vent passageway exits and a carrier block vent passageway entrance and/or sealing surfaces can also be aligned and fluid-tight seals and/or plugs can be formed when the clamping system is in place.

The present disclosure provides novel carrier gas connection devices that provide an interface between a carrier gas source and a GC channel. As used herein, a GC channel refers to a gas chromatography column, optionally with other components that make up a flow path of a sample through the column, such as from sample injection to exiting of the sample from the detector or detectors to the atmosphere or waste. A GC can have multiple channels that analyze samples in parallel or serially.

Figure 1A:
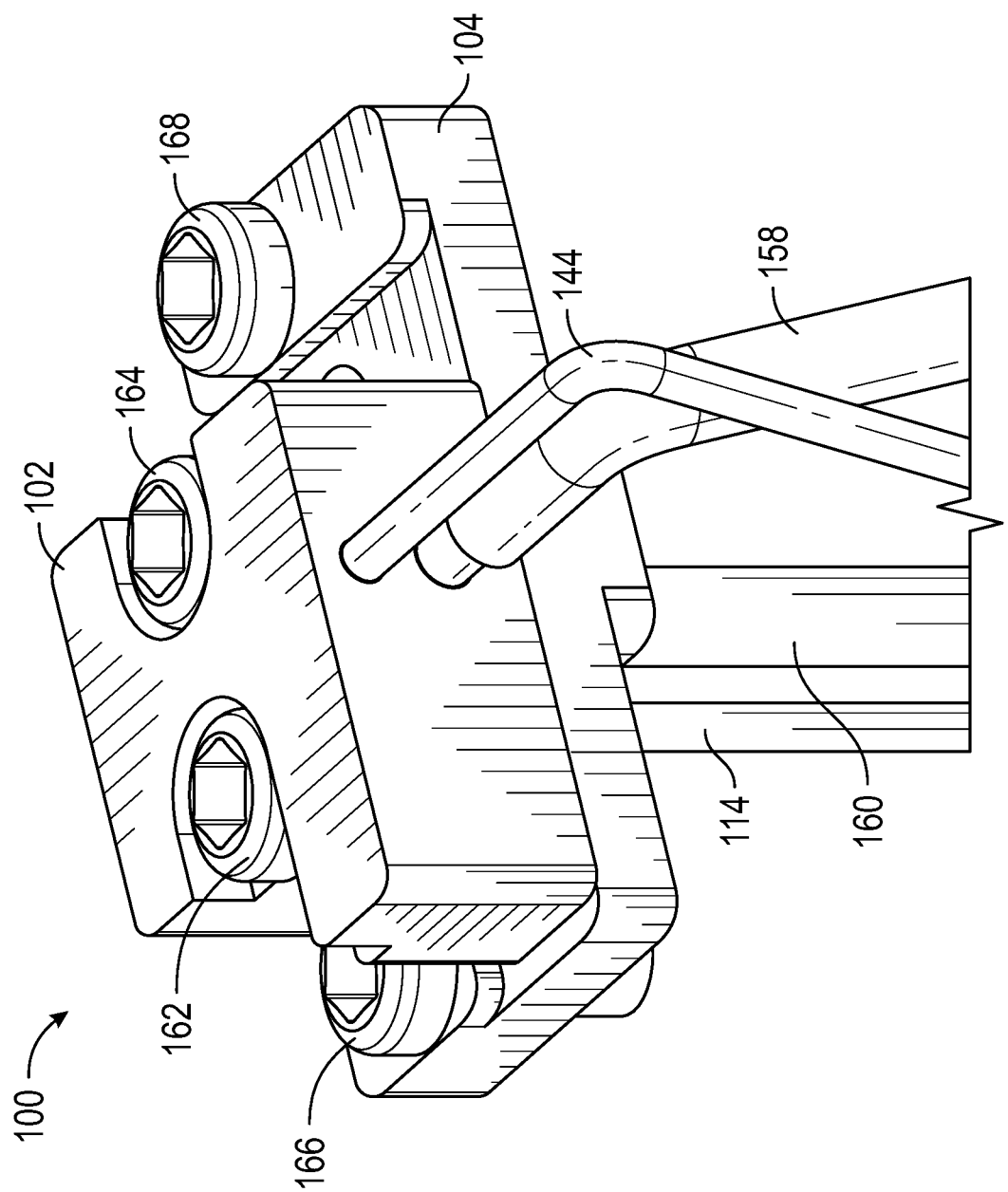
FIGS. 1A to 1G shows an embodiment of a carrier gas connection device of the present invention.

FIG. 1A shows an embodiment of a carrier gas connection device 100 which comprises first and second channel adaptor positions which enables one to easily and quickly change from a first carrier gas to a second carrier gas going to a GC channel. In FIG. 1A, the carrier gas connection device 100 comprises a channel adaptor 102 clamped to a carrier block 104. The carrier gas connection device 100 allows a user to select which of two (or more) different carrier gases will be routed by the carrier gas connection device 100 to a GC channel. The carrier gas connection device can be configured for switching channel adaptor positions by translational movement, or rotational movement, or a combination of both. In some embodiments, the carrier gas connection device can be configured for manual movement by a user (without the use of an actuator or motor). By clamping the channel adaptor 102 at one of the two channel adaptor positions, a user can choose the carrier gas supplied to the GC channel. The unused carrier block carrier gas passageway is plugged by a sealing surface of the channel adaptor 102 at the same time the used carrier block carrier gas passageway is connected to the channel adaptor carrier gas passageway in a fluid-tight connection. In FIG. 1A, a first set of fasteners 162, 164 is used for clamping the channel adaptor 102 to the carrier block 104, and a second set of fasteners 166, 168 for attaching the device to a support. The clamping system and use of fasteners is discussed in more detail below.

Figure 1B:
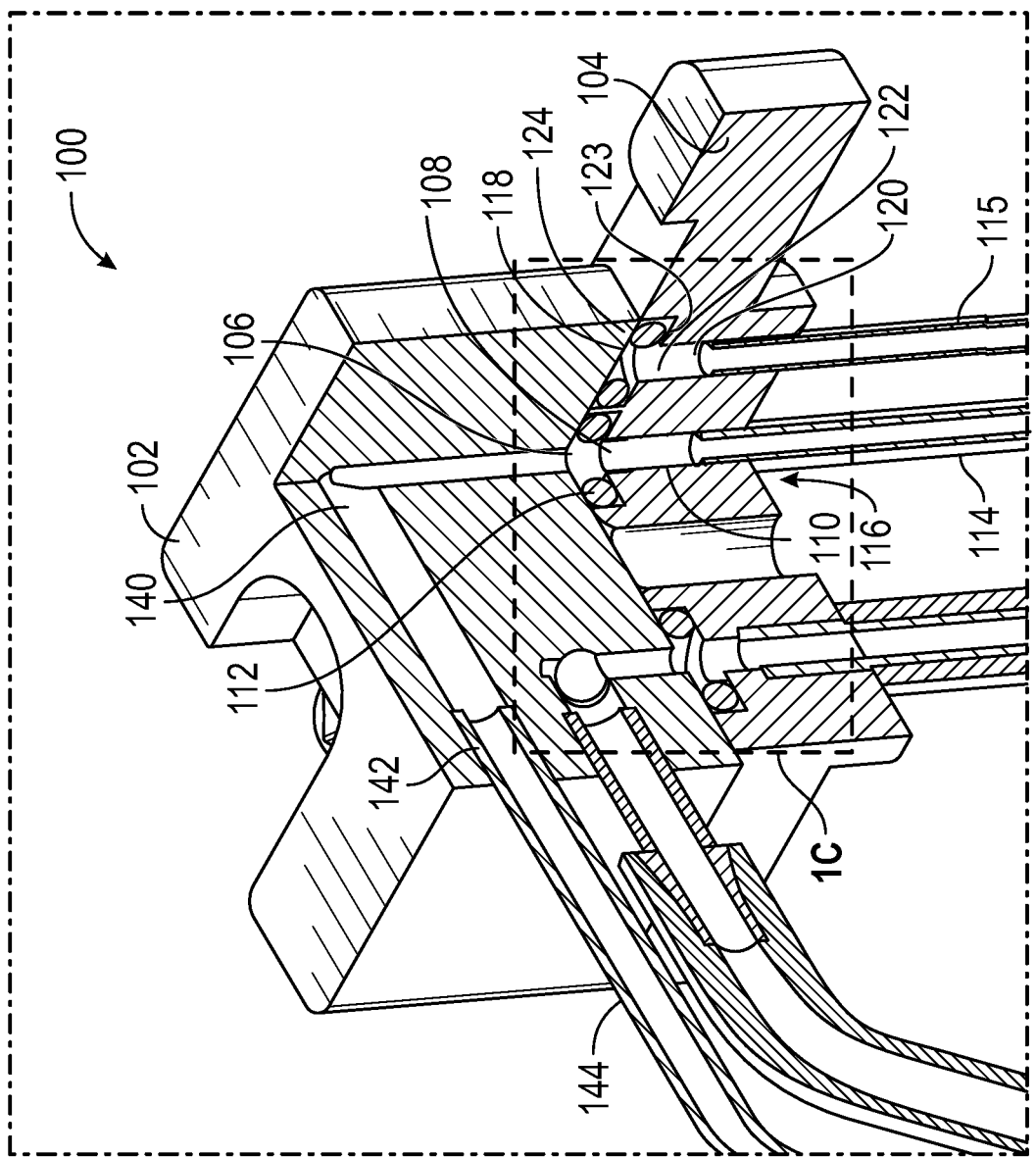
Figure 1C:
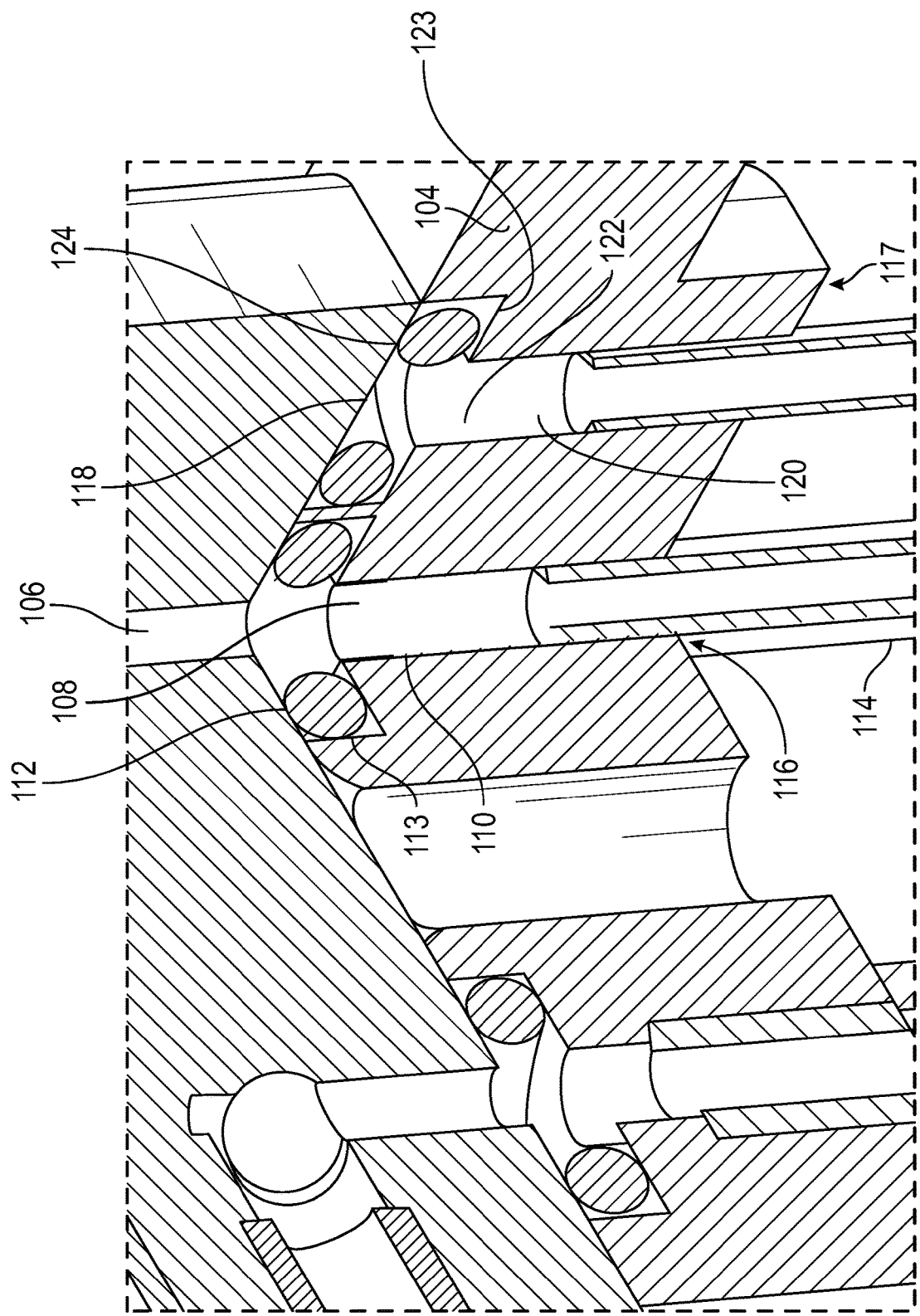

FIGS. 1B and 1C show the carrier gas connection device 100 with a channel adaptor 102 in a first channel adaptor position. FIG. 1B is a partially cutaway view, and FIG. 1C is a close-up view of a portion of FIG. 1B. In this first channel adaptor position, a first carrier gas is provided to the channel adaptor carrier gas passageway entrance and at the same time, flow of a second carrier gas is plugged. More particularly, in FIGS. 1B and 1C, channel adaptor 102 is clamped to carrier block 104 in a first channel adaptor position. As shown in FIG. 1B, in that channel adaptor position, a channel adaptor carrier gas passageway entrance 106 is aligned with an exit 108 of first carrier block carrier gas passageway 110 in carrier block 104. A fluid-tight connection is formed between entrance 106 and exit 108, such as by applying a clamping force between the channel adaptor 102 and carrier block 104. Compliant seal material 112 can be located around exit 108 and/or entrance 106, aiding the formation of the fluid-tight connection. In FIGS. 1B and 1C, compliant seal material 112 is located in recess 113. First carrier block carrier gas passageway 110 is fluidically connected to a first carrier gas source, such as by a carrier gas conduit 114 fluidically connected to entrance 116 of first carrier block carrier gas passageway 110. A fluid-tight connection is made between carrier gas conduit 114 and first carrier block carrier gas passageway 110, though the connection can be permanent or removable. Second carrier block carrier gas passageway 120 is fluidically connected to a second carrier gas source, such as by second carrier gas conduit 115. A fluid-tight connection is made between carrier gas conduit 115 and an entrance 117 of the second carrier block carrier gas passageway 120, and this connection can also be permanent or removable.

In FIG. 1B, a first carrier gas flows from carrier gas conduit 114 to first carrier block carrier gas passageway 110 through a fluid-tight connection, and at the same time, flow of a second carrier gas into channel adaptor 102 and out of device 100 is stopped or otherwise plugged by a sealing surface 118 of the channel adaptor 102. That is, a fluid-tight plug of exit 122 of second carrier block carrier gas passageway 120 is formed by a sealing surface 118 of channel adaptor 102. By plugging second carrier gas passageway 120, spilling of the second carrier gas into the surrounding environment or at least out of second carrier gas conduit 115 is prevented. Furthermore, such spilling is prevented without disconnecting or turning off the second carrier gas source, thereby allowing the second carrier gas to be provided to other channels. FIG. 1C shows compliant seal material 124 located around exit 122, aiding formation of the fluid-tight plug. The compliant seal material 124 can be aligned by a recess 123 in carrier block 104.

Figure 1D:
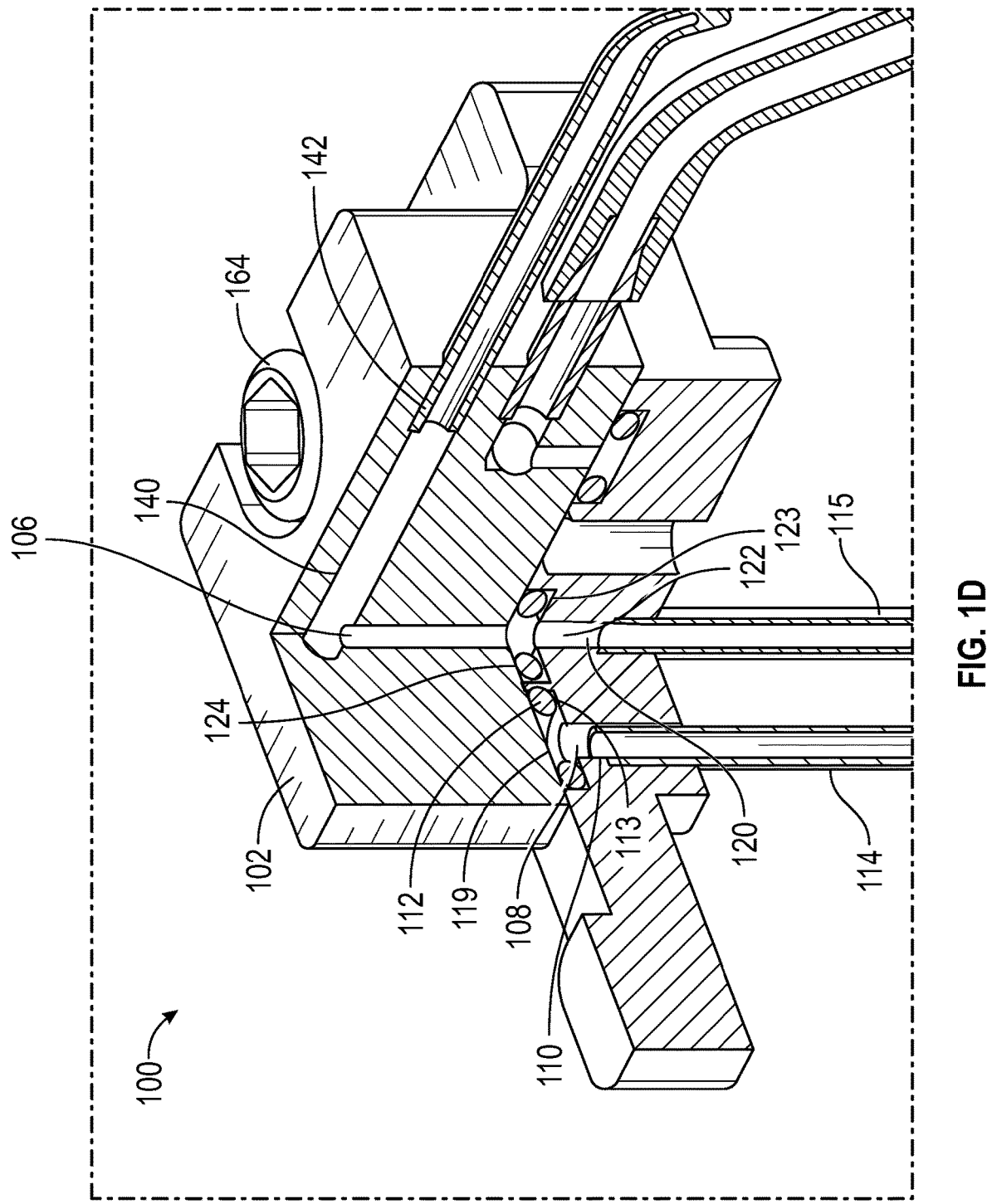

FIG. 1D shows the carrier gas connection device 100 with a channel adaptor in a second channel adaptor position, where a second carrier gas is provided from the exit of a second carrier block carrier gas passageway to the entrance of a channel adaptor carrier gas passageway. FIG. 1D is a partially cutaway view. In FIG. 1D, second carrier gas flows from second carrier gas conduit 115 to second carrier block carrier gas passageway 122 through a fluid-tight connection. Compliant seal material 124 can be located at the exit of the second carrier block carrier gas passageway 122 (such as in recess 123) to aid formation of the fluid-tight connection. At the same time, flow of the first carrier gas into channel adaptor 102 and out of carrier gas connection device 100 is prevented by a sealing surface 119 on the channel adaptor 102, as a fluid-tight plug of exit 108 of first carrier block carrier gas passageway 110 is formed by a sealing surface 119 of channel adaptor 102. In this embodiment, sealing surface 118 (FIG. 1C) and sealing surface 119 are areas of the front face of the channel adaptor that are merely spacially separated from each other, but it is contemplated that they may be separated or differ from each other in other ways. Compliant seal material 112 can be located around exit 108, such as by being located in recess 113, thereby aiding formation of the fluid-tight plug. Channel adaptor 102 comprises channel adaptor carrier gas passageway 140 through which carrier gas can flow from entrance 106 to exit 142.

By allowing a user to switch between the different channel adaptor positions (as illustrated by FIGS. 1B and 1D), the present carrier gas connection device 100 allows for easy switching of the type of carrier gas supplied to a GC channel. An advantage of the present carrier gas connection device 100 is that two or more fluid-tight connections and/or fluid-tight plugs (such as one connection and one plug) are made by the easy and efficient clamping of the channel adaptor 102 to carrier block 104. Channel adaptor carrier gas passageway 140 receives carrier gas from one of the carrier block carrier gas conduits 114 or 115 and simultaneously plugs the other, unused carrier gas conduit, and delivers carrier gas to carrier gas conduit 144 which can be fluidically connected (directly or indirectly) to a GC channel.

The embodiment shown in FIGS. 1B and 1D comprises a carrier block comprising two carrier block carrier gas passageways, so that the connection device is fluidically connected with two carrier gas sources at the same time. This enables fast and easy switching of the carrier gas provided to a GC channel by that connection device. However, it is contemplated the connection device can have more than two carrier block carrier gas passageways, so that the connection device can be fluidically connected with more than two carrier gas sources at the same time. In some embodiments, the carrier block comprises "N" carrier block carrier gas passageways, wherein N is any desired number of carrier gas sources. For instance, N can be 2 to 12, alternatively 2 to 8, alternatively 2, 3, 4, 5 or 6. It should also be noted that the carrier block carrier gas passageways may be complex channels or simple holes. Suitable materials for the carrier block include metals (for example, stainless steel, copper, aluminum and others). In some embodiments, a metal carrier block can be machined, welded, molded, or bonded. In some embodiments, plastics may be machined or molded to form the carrier block, such as for applications less sensitive to leakage or outgassing.

In FIGS. 1B and 1D, carrier block carrier gas conduits 114 or 115 connect the entrances to each of the carrier block carrier gas passageways to a carrier gas source. In some embodiments, each carrier block carrier gas passageway is connected to a different carrier gas source. The carrier gas source could be in the form of canisters or tanks filled with carrier gas, or panels or ports connected to a gas distribution system such as those typically found in laboratories. The canisters could be contained onboard a GC or external to the GC. Carrier gas conduits are used to connect the carrier gas source to the carrier block and to connect the channel adaptor to the GC channel or other components. The carrier gas conduits can be formed of any suitable material, such as metal tubing. The tubing or other carrier gas conduits should be made of a material that does not outgas (such as stainless steel) so as to not introduce contaminants (such as plastic volatilization) into the sample flow path, as well as to avoid air diffusion into the carrier gas. The carrier gas conduits can be connected to the carrier block carrier gas passageway entrances using connectors such as ferrules or other compression fittings or using permanent methods such as brazing or welding. For carrier gas conduits, it is important to have fluid-tight sealing and to avoid diffusion of air into the carrier gas, so suitable connection technologies include brazing, which would minimize the potential for leaks, and a nut and ferrule, which has the advantage of allowing one to un-install the tubing. Carrier gas conduits can also be connected to the carrier block carrier gas passageway entrances by vacuum brazing, which provides better appearance and saves space, but generally does not permit the carrier gas conduit to be un-installed. Carrier gas conduits can also be connected to the carrier block carrier gas passageway entrances by welding, though the appearance is inferior to vacuum brazing. The conduits may fluidically connect directly or indirectly to the gas source. In some embodiments where there are multiple carrier gas connection devices, the carrier gas conduits can be connected between the carrier blocks of each carrier gas connection device such as by having a carrier gas conduit attach to an exit of a carrier gas passageway of a first carrier block and the other end of the carrier gas conduit attaches to the entrance of a carrier gas passageway on a second carrier block. Alternatively, the carrier gas conduit to a carrier block can be attached to the carrier gas conduit of another carrier block and/or the carrier gas source with a union.

Figure 1E:
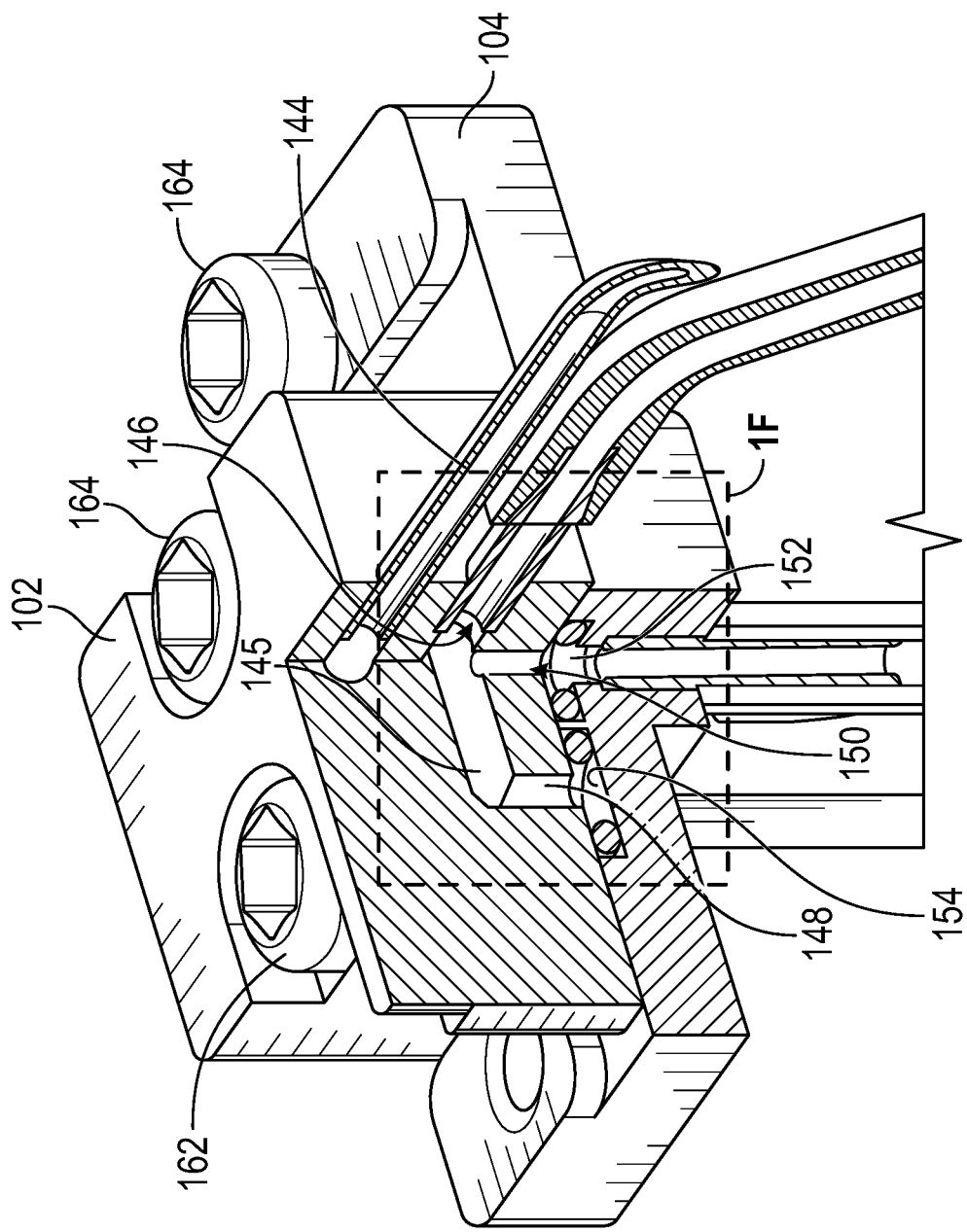
Figure 1F:
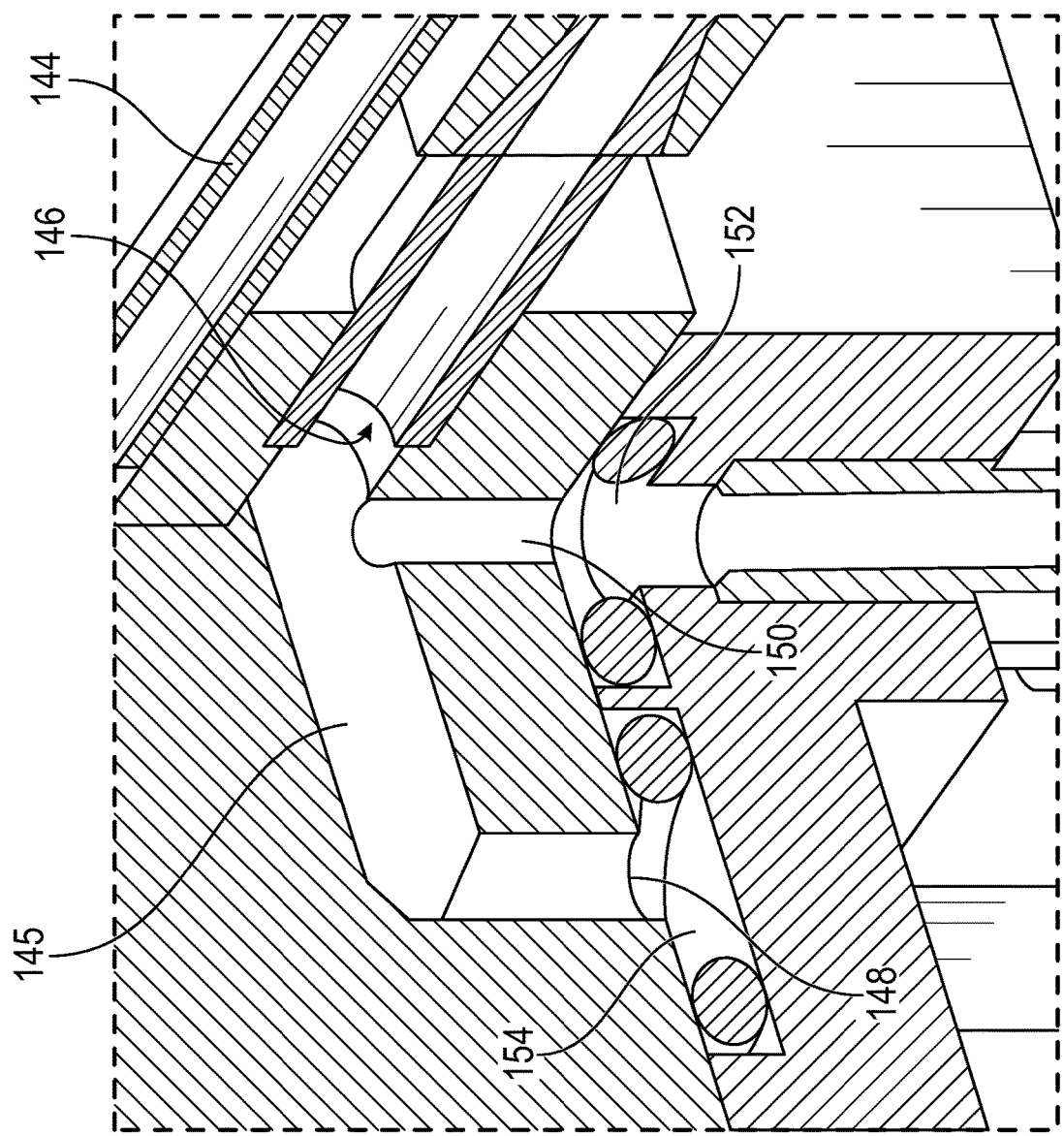
Figure 1G:
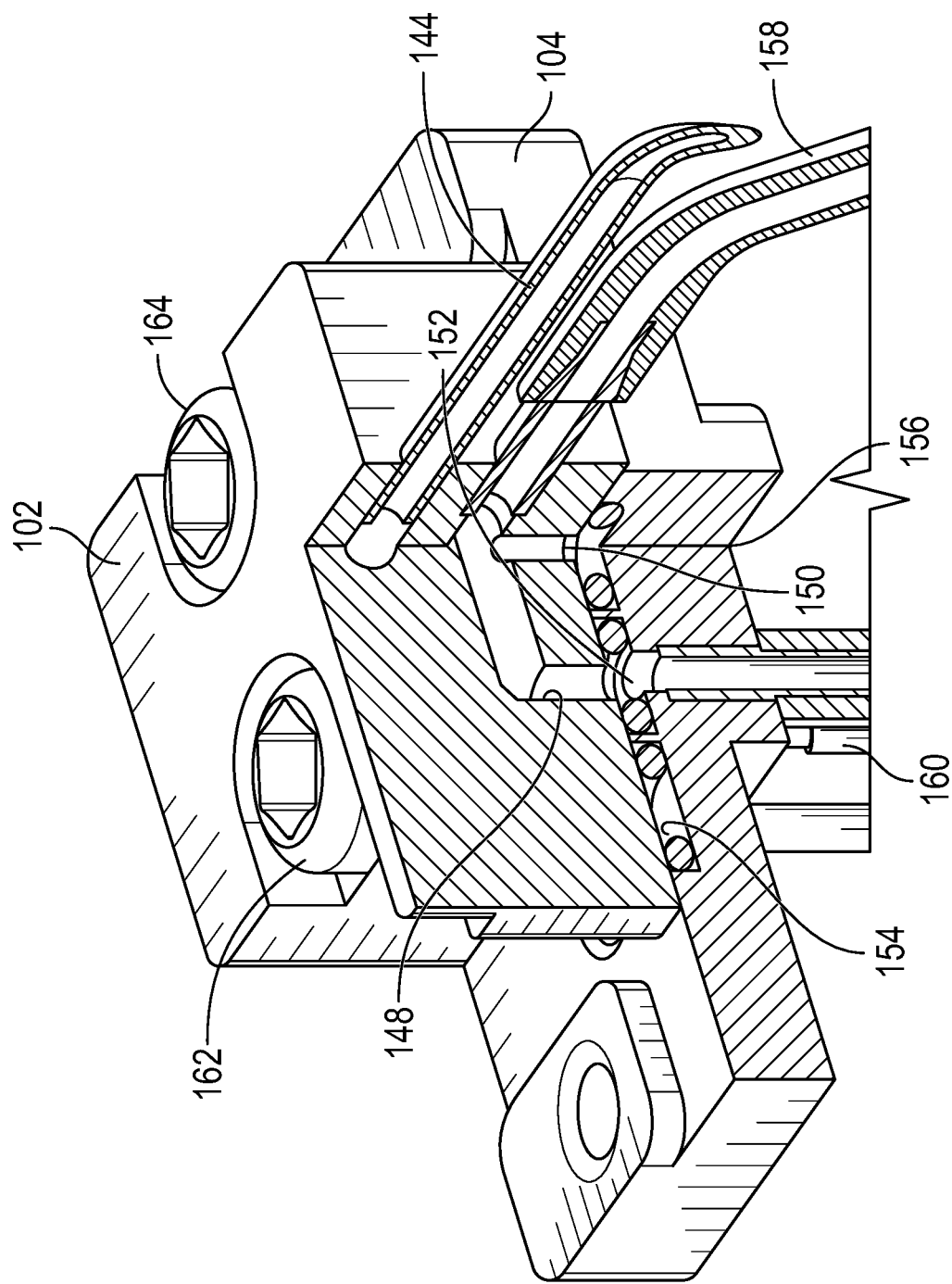
Figure 2:
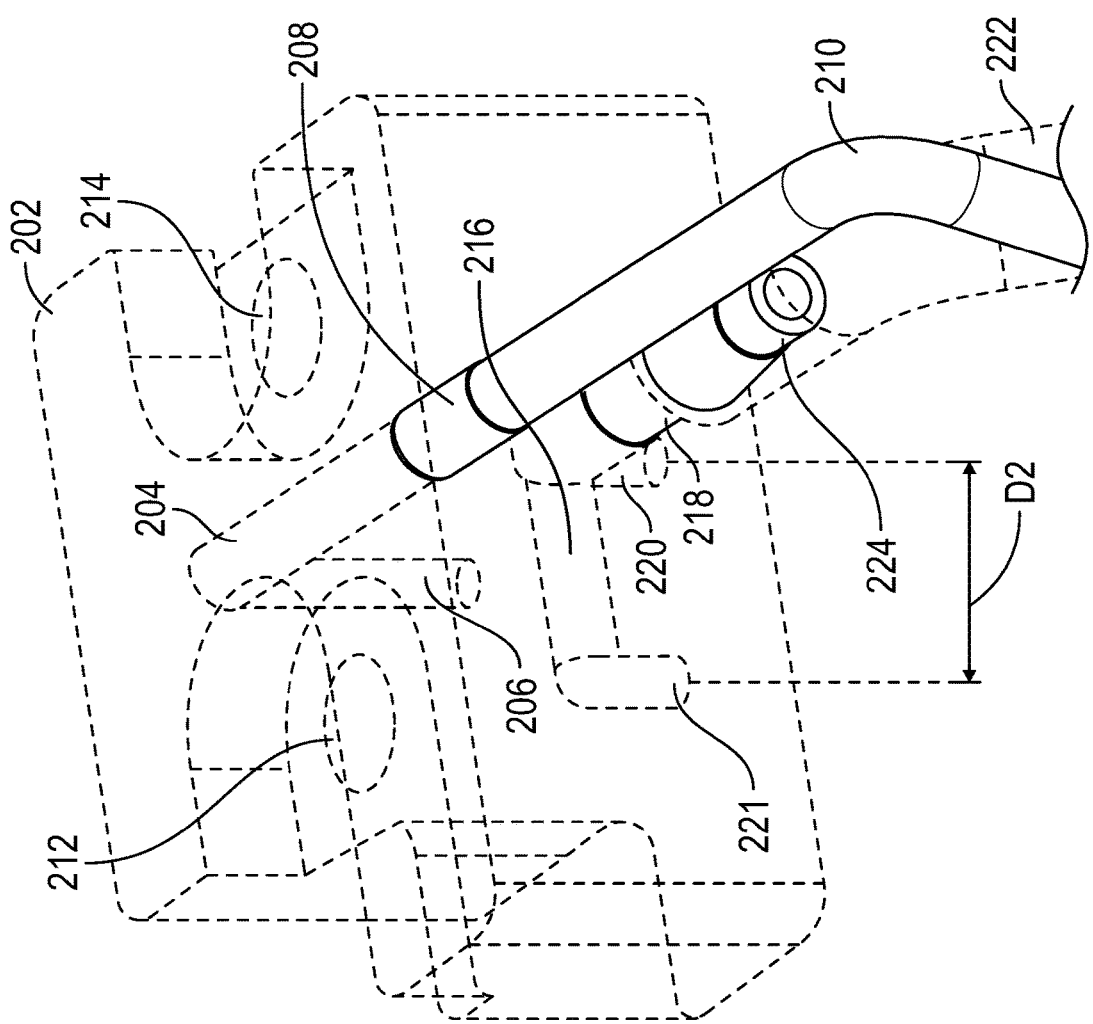
FIG. 2 illustrates an embodiment of a channel adaptor for a carrier gas connection device.

The present carrier gas connection device can also comprise passageways for vent gas (sample waste), enabling the connection device to connect the GC channel to the sample pump and expel excess sample gas (vent gas) from a GC instrument. As illustrated in FIGS. 1E, 1F and 1G, channel adaptor 102 also comprises a channel adaptor vent passageway 145 which comprises a channel adaptor vent passageway entrance 146 and channel adaptor vent passageway exits 148, 150. FIGS. 1E and 1G are partially cutaway views, and FIG. 1F is a close-up of FIG. 1E. The channel adaptor vent passageway is also shown in FIG. 2, and the arrangement of its entrance and exits may be seen more clearly in that Figure. In FIG. 1E, channel adaptor vent passageway 145 has one exit 150 which is fluidically connected with a carrier block vent passageway 152 of the carrier block 104; the other exit 148 of the channel adaptor vent passageway 145 is blocked by a first carrier block sealing surface 154 on carrier block 104. FIG. 1E illustrates the carrier gas connection device in a first channel adaptor position, while FIG. 1G illustrates the device in a second channel adaptor position. These are the same channel adaptor positions discussed above with regard to FIGS. 1B and 1D. As a result, in each of the channel adaptor positions, a fluid-tight connection for the flow of carrier gas from the carrier block into the channel adaptor is made at the same time as a fluid-tight connection for the flow of vent gas from the channel adaptor into the carrier block. In the embodiment shown here, the channel adaptor vent passageway exits change location when the channel adaptor is moved between positions to switch carrier gas types. Since there is only one carrier block vent passageway entrance, the second channel adaptor vent passageway exit and sealing surfaces on the carrier block allows the channel adaptor vent passageway exits to align with the carrier block vent passageway entrance when the channel adaptor is moved from the first to second position while the sealing surfaces on the carrier block plug the unused channel adaptor vent passageway exit.

As discussed above, the channel adaptor and the carrier block can comprise one or more sealing surfaces configured to plug a passageway exit that is not in use. The sealing surface can comprise or consist of a substantially flat surface, or a surface configured to engage a passageway exit. For example, a sealing surface may comprise a recess configured to receive a compliant seal material, or a protrusion configured for inserting in the carrier block carrier gas passageway exit or the channel adaptor vent passageway exit, such as a stopper. Sealing surfaces on a face can be located on either or both sides of a passageway entrance or exit located on that face, such as at 0° and 180° (or 90° and 270°, or at other degrees). For example, a channel adaptor can have two or more sealing surfaces located around a circumference, or on opposite sides, of the channel adaptor carrier gas passageway entrance. Similarly, a carrier block can have two or more sealing surfaces located around a circumference, or on opposite sides, of the carrier block vent passageway entrance. In some embodiments, there are $2*(N-1)$ sealing surfaces to act as plugs for vent passageway exits and/or $2*(N-1)$ sealing surfaces for carrier gas passageway exits, where N is the number of channel adaptor positions.

In FIG. 1G, channel adaptor vent passageway exit 148 is fluidically connected with carrier block vent passageway 152, and channel adaptor vent passageway exit 150 is blocked by a second carrier block sealing surface 156. Each of carrier block sealing surfaces 154, 156 and carrier block vent passageway 152 can have a compliant seal material located to aid in forming a fluid-tight plug or connection, respectively. Carrier block vent passageway 152 can also have a compliant seal material at its entrance. Vent gas is delivered to the channel adaptor by vent conduit 158 and is transferred to vent gas conduit 160. The other end of vent conduit 158 can be fluidically connected to the GC channel.

In some embodiments, the channel adaptor comprises a vent passageway having one entrance and N exits, wherein N is the number of carrier gas channel adaptor positions (as discussed above). The exits are part of the same vent passageway (i.e. connected), and multiple exits are provided; otherwise, when the channel adaptor position was changed by translational or rotational movement or a combination of both (aside from rotational movement about the carrier block vent passageway entrance as described below), the channel adaptor vent passageway exit would change position and would no longer be aligned with the carrier block carrier gas vent passageway entrance. To accommodate this, multiple exits are provided for the channel block vent passageway which correspond to the multiple channel adaptor positions of the connection device. Sealing surfaces on the carrier block may plug the extra channel adaptor vent passageway exits that are not aligned with the carrier block vent passageway entrance for a particular channel adaptor position. In some embodiments, if the carrier gas connection device is configured for switching channel adaptor positions by rotational movement about the carrier block vent passageway entrance, the channel adaptor vent passageway exit may not move when the channel adaptor position is switched; in such embodiments, it can suffice for the channel adaptor vent passageway to have one exit rather than multiple. In some embodiments, the carrier gas passageway exits of the carrier block are located on a constant radius arc around the vent passageway entrance of the carrier block. Additionally, the carrier gas passageway entrance and sealing surfaces are located on the same constant radius arc around the vent passageway exit on the channel adaptor. Rather than linear translation to switch carrier gases, one would rotate the channel adaptor about the vent passageway entrance on the carrier block so the vent passageway exit on the channel adaptor remained aligned with the mating vent passageway entrance of the carrier block and the carrier gas passageway entrance on the channel adaptor moved from one channel adaptor position to another channel adaptor position. In such embodiments, the carrier block would not be required to have sealing surfaces configured to plug vent passageways of the channel adaptor and the channel adaptor would only need one vent passageway exit.

Vent gas conduits can be connected to the carrier gas connection device in any suitable way. For vent gas conduits, which only sees the portion of the sample to be expelled as waste rather the volume of sample to be injected and analyzed, fluid-tight sealing and outgassing is less important, and suitable connection technologies for connecting the vent gas conduits to an entrance of the channel adaptor vent passageway include barbed fittings, luer lock style connectors, push-to-connect fittings, or glue bonding. The vent conduits can be metal or plastic and attached to the carrier block using compression fittings, ferrules, or other known connectors or by permanent methods such as with an adhesive or welding or brazing if the materials of the conduits and carrier block allow for it. If the GC channels are performing analyses that allow the sample pumps to be shared such as injecting the same sample and volume of sample into two or more channels at the same time while using the same carrier gas type, the vent conduits can be connected between the carrier blocks of each carrier gas connection device such as by having a vent conduit attach to an exit of a carrier block vent passageway of a first carrier block and the other end of the vent conduit attaches to an entrance of a carrier block vent passageway on a second carrier block, or the vent conduit to a carrier block can be attached to the vent conduit of another carrier block with a union. If separate pumps are required for each channel, the vent conduit can be attached to a pump independent of the vent conduits of other channels. In some embodiments, the channel adaptor further comprises a channel adaptor vent passageway having one or more exits configured to align and form fluid-tight connections with one or more entrances of a carrier block vent passageway. In some embodiments, a carrier block can comprise two or more entrances to a carrier block vent passageway (e.g., two entrances converge to a passageway with one exit) and the channel adaptor can comprise one exit to the channel adaptor vent passageway which aligns and forms fluid-tight connections with the first entrance of the carrier block vent passageway when in one channel adaptor position and the second entrance of the carrier block vent passageway when in another channel adaptor position. In these embodiments, the channel adaptor may also have sealing surfaces to plug the unused carrier block vent passageway entrances when changing channel adaptor positions.

As explained above, the carrier gas connection device can be configured to comprise two or more channel adaptor positions. The channel adaptor can be changed or switched from one channel adaptor position to another channel adaptor position by manual movement, including linear or translational movement, rotational movement, or combinations thereof. In some embodiments, a channel adaptor vent passageway exit and a carrier block vent passageway entrance and sealing surface(s) are located so that they form fluid-tight seals and/or plugs when the channel adaptor is clamped in a channel adaptor position. For instance, translational movement of the channel adaptor may result in a single carrier block vent passageway entrance being aligned with one of a plurality of channel adaptor vent passageway exits (or in some embodiments, one of a plurality of carrier block vent passageway entrances is aligned with a single channel adaptor vent passageway exit, as described above).

FIG. 2 illustrates a channel adaptor 202, shown as partially transparent so that internal features can be seen. Channel adaptor 202 defines a channel adaptor carrier gas passageway 204 having an entrance 206 and an exit 208. Entrance 206 receives carrier gas from a carrier block, and exit 208 is fluidically connected (directly or indirectly) to a GC channel. In FIG. 2, a carrier gas conduit 210 or other conduit for flowing the carrier gas to the GC channel is fluidically connected to exit 208, such as by inserting a portion of carrier gas conduit 210 into channel adaptor carrier gas passageway 204. Alternative ways of connecting a carrier gas conduit to a channel adaptor are described above. Channel adaptor 202 comprises two fasteners (not shown) that pass through holes 212, 214 of the channel adaptor 202. Alternative clamping systems as described below can be used in place of the fasteners and holes.

In some embodiments, the channel adaptor carrier gas passageway entrance 206 is located on a first adaptor face or other surface, and the channel adaptor carrier gas passageway exit 208 is located on the same channel adaptor face or surface, or on a second adaptor face or surface. The channel adaptor carrier gas passageway 204 can have any desired length, cross-section, or shape. For instance, in some embodiments, a larger cross-section may be desired for easier machining, while in other embodiments, a smaller cross-section may be desired, such as when a filter is included in the carrier gas flow path. In some embodiments, the carrier gas flow path has a diameter in the range of 0.5 mm to 2 mm, alternatively from 1 mm to 1.5 mm, alternatively 0.7 mm or 0.8 mm. In some embodiments, the first and second adaptor faces can be substantially parallel, substantially perpendicular, or at any desired angle to each other on the same or different faces or surfaces. In some embodiments, the first face is substantially perpendicular or at another angle to the second face.

Channel adaptor 202 also comprises a channel adaptor vent passageway 216 which receives gas vented from the GC channel, such as excess sample gas pulled through the sample pump during the injection. Channel adaptor vent passageway 216 comprises a channel adaptor vent passageway entrance 218 and two channel adaptor vent passageway exits 220, 221 (or a different number of exits, depending on the number of channel adaptor positions). Vent gas from the GC, for instance, from a GC channel, travels through vent tubing 222, which is fluidically connected to channel adaptor vent passageway entrance 218, such as by having connector 224 inserted into vent tubing 222. Vent tubing 222 (which represents any conduit suitable for the gas to be vented) and channel adaptor vent passageway entrance 218 can also be connected by vacuum brazing, a ferrule and nut or threaded connection, a barb fitting, glueing, a push-to-connect fitting, or combination thereof. Suitable vent tubing includes polyurethate tubing, which is flexible and easy to insert over a barbed fitting. Gas travels through channel adaptor vent passageway 216 to exit 220 when the channel adaptor is in its first channel adaptor position. As illustrated in FIG. 2, the channel adaptor vent passageway 216 can split or diverge so as to have two or more channel adaptor vent passageway exits 220, 221. The channel adaptor vent passageway exits 220, 221 can be spaced linearly at a distance D2 (as shown in FIG. 2, and as described in more detail below).

A channel adaptor can be formed from the same materials as those described above for the carrier block. In the present carrier gas connection devices, the channel adaptor can be formed from the same material(s) or different material(s) as the carrier block. In some embodiments of the present devices, the channel adaptor has an inner face configured to mate with an inner face of the carrier block (and vice versa), and the channel adaptor and the carrier block have outer faces opposite their inner faces. Outer faces may be substantially parallel with inner faces, or they may be disposed at an angle.

Figure 3A:
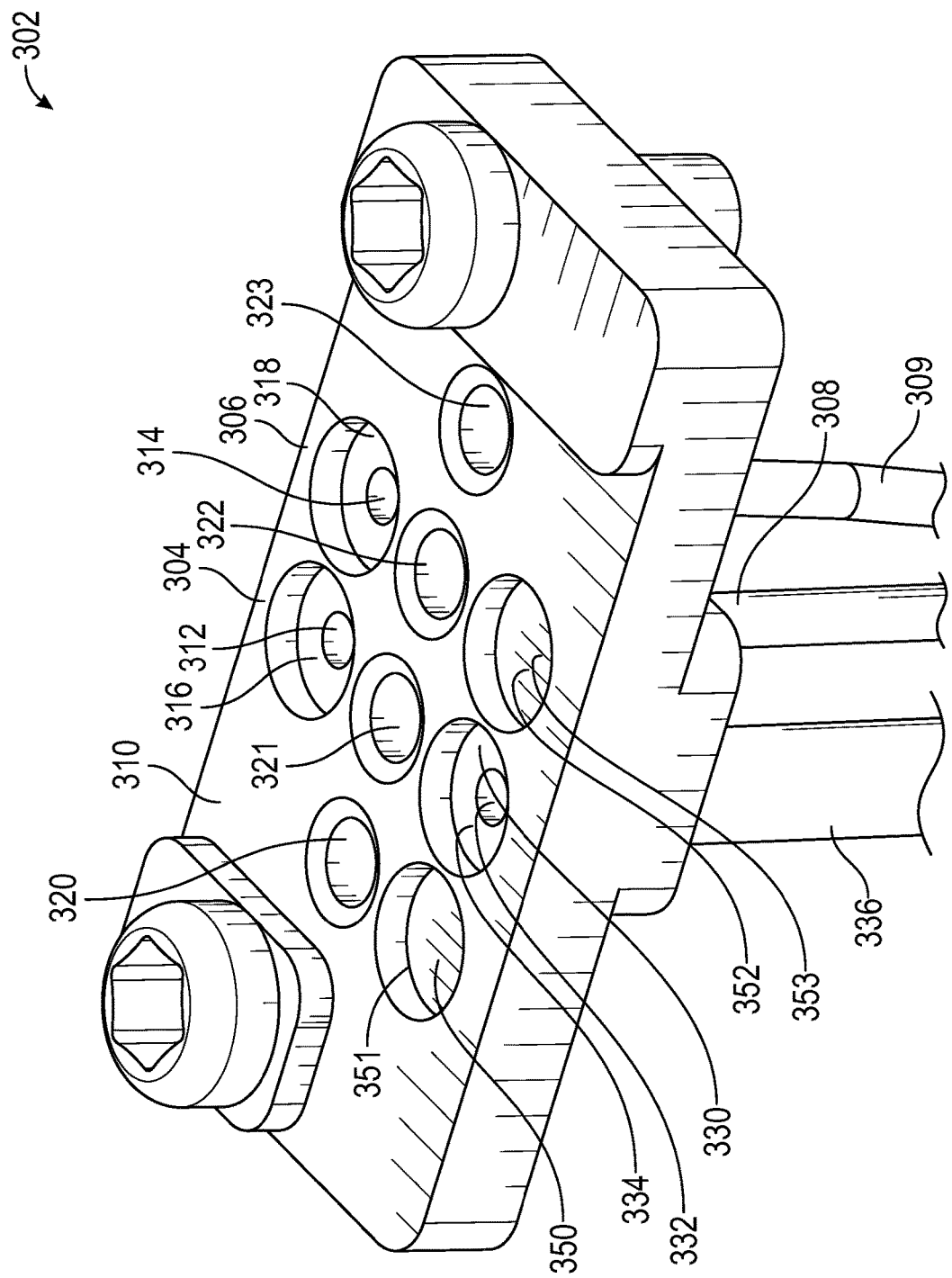
FIGS. 3A to 3C illustrate an embodiment of a carrier block for a carrier gas connection device.
Figure 3B:
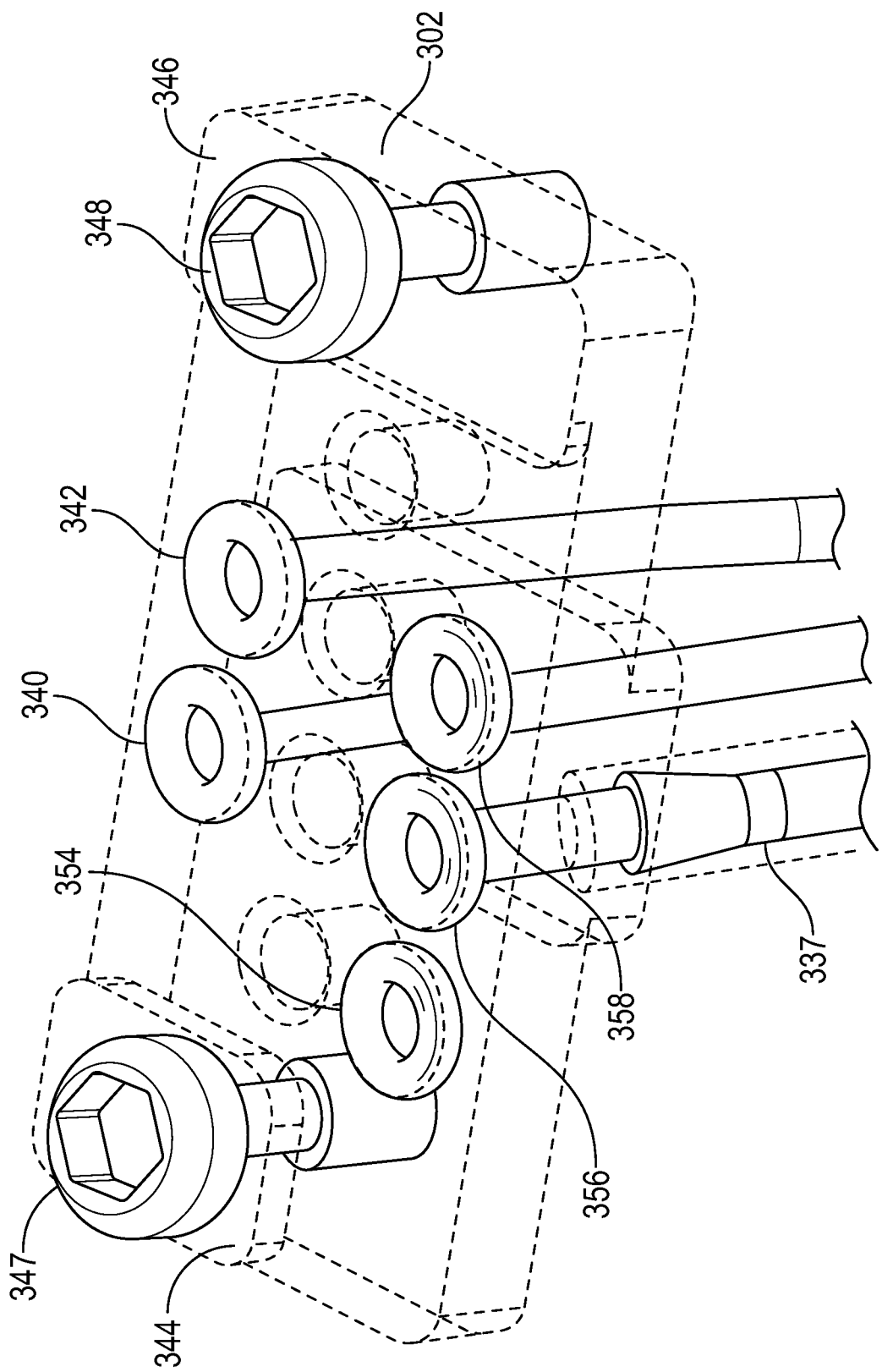
Figure 3C:
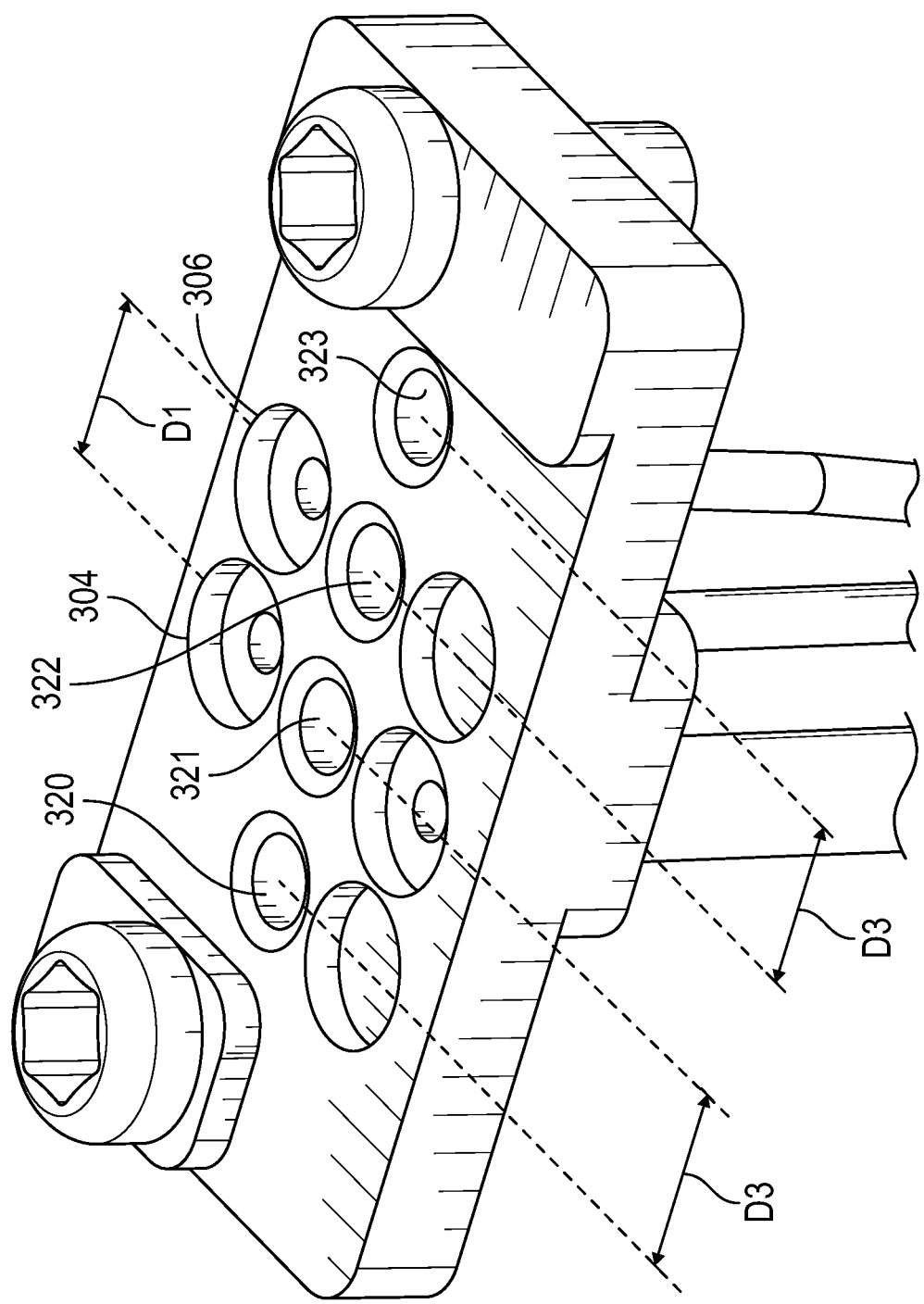

As explained above, the carrier gas connection devices also comprise a carrier block. FIG. 3A shows a carrier block 302 in more detail. The carrier block comprises at least two carrier block carrier gas passageways 304, 306 for receiving carrier gases. A first carrier block carrier gas passageway 304 is configured for fluidically connecting to a first carrier gas source, such as by connection to a first carrier gas source conduit 308. A second carrier block carrier gas passageway 306 is configured for fluidically connecting to a second carrier gas source conduit 309. The carrier block carrier gas passageways 304, 306 generally define a flow path through the carrier block 302, from an entrance to an exit (though a passageway can have a plurality of entrances and/or a plurality of exits). Two or more carrier block carrier gas passageways can converge or split as to share an entrance, an exit and/or a flow path. A carrier block carrier gas passageway entrance can be an opening configured to receive a conduit, or it can comprise a connector which can be inserted into a conduit or another structure. For instance, a conduit providing carrier gas may extend into the carrier block carrier gas passageway. In some embodiments, the first carrier block carrier gas passageway 304 or its exit is spaced apart from second carrier block carrier gas passageway 306 (or its exit) by a distance D1 (as shown in FIG. 3C). D1 may be selected with consideration of the size of conduits (tubing) and compliant seal material contemplated for use with the carrier block. As an example, where the contemplated tubing size is 1/16 inch, D1 can be about 4.4 mm. As another example, where the contemplated tubing size is 1/32 inch, D1 can be about 2.0 mm. In some embodiments, D1 is in a range of 1 mm to 9 mm, alternatively 2 mm to 6 mm. For carrier blocks having more than two carrier gas passageway exits, in some embodiments, each carrier gas passageway exit can be a distance D1 from its adjacent carrier gas passageway exit(s). Additionally, each sealing surface on the channel adaptor adapted to plug the unused carrier gas passageway exits can be spaced at a distance D1 from either its adjacent sealing surface and/or the carrier gas passageway entrance.

The carrier block carrier gas passageway entrance can be an opening that receives a conduit, or a connector which can be inserted into a conduit. Carrier gas conduits may extend into the carrier gas passageway, and they can be permanently or removably attached. In some embodiments of the carrier block, the entrances to carrier block carrier gas passageways can be disposed on a first face of the carrier block, and the exits can be disposed on a second face. In some embodiments, the second face is substantially parallel with the first face. In some embodiments, the entrances and exits of the carrier block carrier gas passageways are disposed on a single face of the carrier block. As illustrated in FIG. 3A, a passageway comprises a flow path through the carrier block, from an entrance to an exit, and the exits can be on a second face 310. In some embodiments, the second face 310 is substantially parallel with the first face; in other embodiments, a passageway's entrance(s) and exit(s) are located on a single face. The carrier block carrier gas passageway exits 312, 314 may be located in recesses 316, 318 and/or surrounded by a compliant seal material such as o-rings. Recesses 316, 318 can align the compliant seal material; the depth of recess relative to thickness of the compliant seal material will dictate the amount of compression of the complaint seal material. For example, o-rings 340, 342 (shown in FIG. 3B) may be set in recesses 316, 318, around the carrier block carrier gas passageway exits 312, 314 of a carrier block carrier gas passageway.

The present carrier gas connection devices also comprise a clamping system, which may be separate from the channel adaptor and the carrier block or may be constituted in whole or in part by the channel adaptor and/or the carrier block. The clamping system provides the force to seal and/or align the passageway entrances and exits or plugs on the carrier block to the corresponding passageway entrances and exits or plugs on the channel adaptor. The clamping system can be one or more fasteners and one or more holes in the channel adaptor and the carrier block configured for receiving a fastener. The holes can be clearance holes or threaded holes, such as when the fastener is a bolt, screw, or pin. In some embodiments, the carrier block defines a plurality of sets of holes, a first set corresponds to a first channel adaptor position and a second set corresponds to a second channel adaptor position. When the fastener is a bolt, the clamping system may comprise a nut with threads matching the bolt. Alternative manners of clamping the carrier block and the channel adaptor are contemplated. For instance, in place of a screw or other fastener inserted through the channel adaptor and the carrier block, a clamp or holder can clamp them together and provide a clamping force sufficient to form a fluid-tight connection between the passageways of the carrier block and the channel adaptor. The clamp can be an external clamp, that is, the clamp does not pass through the carrier block or the channel adaptor. In some embodiments, the channel adaptor and the carrier block have interlocking features configured to clamp them together, and such features may be the clamping system in whole or in part. For instance, the carrier block can be fastened to the channel adaptor by a snap-fit, or friction-fit, or in any other suitable manner. The clamping system can comprise two, three, four or more aligned holes, and a corresponding number of fasteners, or one fastener for clamping and a pin or other feature to prevent rotation and provide the remaining alignment functionality. In some embodiments, the clamping system comprises one fastener for clamping and a pin or other feature to prevent rotation of the channel adaptor and provide alignment between entrances and exits. In some embodiments, the clamping system comprises two fasteners that pass through aligned holes in the carrier block and channel adaptor.

For instance, an embodiment of a clamping system comprises the fasteners 162, 164 in FIG. 1A inserted into clearance holes in the channel adaptor 102 and into threaded holes in carrier block 104. Since the clearance holes and threaded holes are not visible in FIG. 1A, reference is made to FIGS. 3A and 3B, which illustrate holes in a carrier block for receiving fasteners. In FIG. 3A, the carrier block 302 comprises a plurality of sets of holes, where the different sets correspond to different channel adaptor positions. For example holes 320 and 322 are a first set of holes in carrier block 302, and holes 321 and 323 are a second set. When the first set of holes 320, 322 is used for clamping the channel adaptor to the carrier block, the channel adaptor is in the first position. When the second set of holes 321, 323 is used, the channel adaptor is in the second position. The channel adaptor (not shown in FIG. 3A) has holes that correspond to a set of holes on the carrier block, such as by having a corresponding location and/or size. In some embodiments, such as when the channel adaptor is configured to move from one channel adaptor position to another by pure translation, the carrier block comprises two sets of holes where the sets of holes are spaced apart or offset a distance D3 (as shown in FIG. 3C). In some embodiments, D3 is substantially equal to D1 so that the sets of holes are offset in substantially the same direction and by a distance substantially the same as the distance D1 between first and second carrier block carrier gas passageways 304, 306. Because the clamping systems' sets of holes in the carrier block are offset by substantially the same distance as the carrier block carrier gas passageways 304, 306, the sets of holes correspond to the first and second channel adaptor positions.

A single set of holes in the channel adaptor can be aligned with different sets of holes in the carrier block at different times when the channel adaptor is moved between channel adaptor positions. Although the sets of holes in the carrier block of FIGS. 3A to 3C comprise two holes, this is exemplary, and the sets can have 1, 3, 4 or any desired number of holes. The carrier block 302 can be removably fastened to the channel adaptor by inserting a bolt, screw, or other fastener through the clearance holes of channel adaptor and (i) threaded holes 320, 322 or (ii) threaded holes 321, 323. In some embodiments, all the holes of both sets are in a line or linear arrangement. The holes within a given set in the carrier block can be spaced at any desired distance from each other, though the distance between holes of one set (320, 322) are substantially the same as the distance between holes of another set (321, 323) in this embodiment. Alternative manners of clamping the carrier block and the channel adaptor are contemplated, such as a clamp or holder that provides a clamping force that forms a fluid-tight connection. In some embodiments, the fasteners also serve to provide alignment between the channel adaptor and carrier block, but alternative alignment features and/or devices to align the channel adaptor and carrier block are also contemplated.

In some embodiments, such as when the channel adaptor is configured to move from one channel adaptor position to another by rotation or a combination of rotation and translation, holes for the fasteners and carrier gas exits on the carrier block may not be equidistant from the axis of rotation, and the sets of holes for the fasteners need not be offset by the same distance as the distance between the carrier gas exits. In such embodiments, one can reduce the number of entrances, exits, and sealing surfaces (thereby simplifying the device) by providing that the relative transformation (rotational and/or translational) between a first channel adaptor position and a second channel adaptor position should equal the relative transformation (rotational and/or translational) between a second channel adaptor position and a third channel adaptor position to minimize the number of sealing surfaces and (if applicable) vent passageway exits. The pattern or spacing among the carrier gas passageway exit being used, the holes for fasteners being used (if holes are employed in the clamping system or alignment features), and vent passageway exits on the channel adaptor (when the channel adaptor is located in that particular channel adaptor position) is the same from one channel adaptor position to a second (or Nth) channel adaptor position. For example, in reference to FIG. 3A, the pattern or spacing among hole 320, hole 322, and carrier block carrier gas passageway exit 312 (and channel adaptor vent passageway exit 220 when present in channel adaptor) when the channel adaptor is in a first channel adaptor position is substantially the same as the pattern or spacing among hole 321, hole 323, and carrier block carrier gas passageway exit 314 (and channel adaptor vent passageway exit 221 when present in channel adaptor). In this way, the carrier gas connection device can be configured such that entrances and exits will line up in all of the channel adaptor positions. As a further example, in some embodiments where the vent entrance on the carrier block is the center of rotation for switching channel adaptor positions, the carrier gas exits can be on a constant radius arc around the vent passageway, the sets of holes for the fasteners could either be on the same or a different constant radius arc. If this were a different constant radius arc, then the angle between sets of fasteners and the angle between carrier gas exits could be substantially the same, rather than having the distance between sets of fasteners D3 and the distance between carrier gas exits D1 being substantially the same.

In the embodiment shown in FIG. 3A, the carrier block also comprises at least one carrier block vent passageway 330 having an entrance 332 disposed in a recess 334 and/or surrounded by a compliant seal material. The vent passageway entrance 332 is shown on the same face of the carrier block 302 as the carrier block carrier gas passageway exits 304, 306. The vent passageway 330 also comprises an exit (not visible). Like the entrance to the carrier block carrier gas passageways, the exit can be configured to have a vent conduit inserted or joined in a substantially fluid-tight connection. The vent passageway 330 can comprise a connector 337 (in FIG. 3B) configured for insertion to a vent gas conduit 336. Conduits can be integral with passageways, or permanently attached, or removably attached.

Carrier block vent passageway 330 can be in fluid communication with vent gas conduit 336. Carrier block 302 also comprises a first sealing surface 350 for plugging an unused exit of a channel adaptor vent passageway exit. Carrier block also comprises a second sealing surface 352 for plugging a different unused exit of a channel adaptor vent passageway exit when a channel adaptor is moved to a different channel adaptor position. Sealing surfaces 350, 352 can simply be flat surfaces on a face of carrier block 302. In some embodiments, sealing surfaces 350, 352 comprise recesses 351, 353 in which compliant seal material 354, 358 is located, as shown in FIG. 3B. Compliant seal material 356 can also be located at vent passageway 330 in recess 334. While FIGS. 3A and 3B show compliant seal material and/or recesses on a carrier block, it is also contemplated that compliant seal material and/or recesses could be located on the channel adaptor. In some embodiments, it may be preferable to locate compliant seal material and recesses on the carrier block, such as when the carrier block remains stationary in the GC instrument; in such embodiments, the compliant seal material is more likely to stay in place when the channel adaptor is moved from one channel adaptor position to a different channel adaptor position. Another advantage in such embodiments is that the compliant seal material will be present if the channel adaptor is replaced with a channel cap plate (described in more detail below) so as to remove a channel from use by capping off all of the exits and entrances of the carrier block.

In some embodiments described above, an entrance or exit of a passageway, or a flow path or conduit of the carrier block and/or the channel adaptor, is surrounded by a compliant seal material, such as a resilient, essentially fluid impermeable material. In some embodiments, the compliant seal material is in the form of an o-ring. The compliant seal material can be any shape suitable for an entrance or exit within the present device. For example, the compliant seal material may be a toroidal-shaped o-ring, a gasket with a rectangular cross-section, a metallic gasket, or another shape of compliant seal material. In situations where multiple seals need to be made on the same surface, the compliant seal material can integrate the function of multiple o-rings and/or gaskets and have multiple holes. In some embodiments, the compliant seal material can be a fluoroelastomer material. The compliant seal material can be various rubbers depending on the carrier gas and, if a vent passageway is present, the type of samples or solvents being injected, e.g. fluoropolymers, buna-n, EPDM or, in extreme cases, metallic with compliant over-plating. The compliant seal material may also be coated with a chemically inert coating if the compliant seal material allows for it. In some embodiments, a sealing surface may be formed of a soft metal such as copper or aluminum, or a material such as PEEK or nylon, can also be used. When a soft metal, PEEK, or nylon is used, it may be desirable to replace it whenever the channel adaptor is removed and reinstalled, as such materials may have permanent deformation when used for forming a seal.

A recess or other feature on a carrier block can align the compliant seal material and help to hold the compliant seal material on the carrier block during assembly of the connection device. The recess depth can be specified to determine how much the compliant seal material will compress to form a fluid-tight seal before the sealing surface of the channel adaptor bottoms out on the face containing the exits of the carrier block carrier gas passageways in the carrier block. In some embodiments where the compliant seal material is in the form of an o-ring, the o-ring should compress by 15% to 25%, or by 20%, to create a fluid-tight seal. Alternatively, a flat or cylindrical gasket could be used as the resilient seal instead of an o-ring, and different compression percentages may be selected.

As an additional alternative, a larger or noncircular o-ring would also make it such that the carrier gas connection device need not have two vent passageway exits in the channel adaptor or two vent entrances in the carrier block. For example, if the o-ring or other compliant seal material were large enough and/or shaped in a way (such as oval) such that when one moves the channel adaptor from one channel adaptor position to another, the channel adaptor vent passageway exit would still be within the o-ring and fluidically connected to the vent passageway entrance of the carrier block, and one could eliminate the second exit (as well as the third exit, etc. if present) of the channel adaptor vent passageway as well as the sealing surfaces and o-rings on the carrier block for the second channel adaptor vent passageway exits (as well as the third and other exits, if present).

In some embodiments, a pattern or spacing among channel adaptor vent passageway exits (such as exits 220, 221 in FIG. 2) and vent passageway entrance and sealing surfaces of the carrier block is substantially the same as the pattern or spacing among the carrier block carrier gas passageway exits of a carrier block, so that the channel adaptor vent passageway exits 220, 221 will be aligned with the carrier block vent passageway entrance or a sealing surface whenever the channel adaptor is fastened in one of the channel adaptor positions. In some embodiments, such as when the channel adaptor is configured to move from one channel adaptor position to another by pure translation, distance D2 between exits 220, 221 can be substantially equal to D1 (where D1 is the distance between two carrier block carrier gas passageways of a carrier block). The sealing surfaces 350 and 352 of carrier block (as shown in FIG. 3A) are each separated from the entrance 332 of the carrier block vent passageway 330 by distance D2, so that one of sealing surfaces 350, 352 will be aligned with the unused channel adaptor vent passageway exit. Thus, when the pattern or spacing among channel adaptor vent passageway exits is substantially the same as the pattern or spacing among the carrier block carrier gas passageway exits (such as when D2 is substantially equal to D1), one of the channel adaptor vent passageway exits will be aligned with a carrier block vent passageway entrance whenever one of the carrier block carrier gas passageway exits will be aligned with the channel adaptor carrier gas passageway entrance. This configuration aids the formation of a fluid-tight connections and allows waste or other vent gas to flow out of the carrier gas connection device.

The carrier block can include one or more projections or features configured for attaching the carrier block to a GC instrument. For example, as shown in FIG. 3B, carrier block includes flanges 344, 346 which are configured for securing the carrier block 302 to a support (such as by fasteners 347, 348) without interfering with the carrier block's engagement of the channel adaptor or conduits. The projections or features can have clearance holes, so that a fastener passing through the hole attaches the carrier block to the support. The projections or features can be configured to avoid interfering with the carrier block's engagement of the channel adaptor or conduits. The support can be a GC instrument or a part thereof, such as a housing, case or chassis for a GC instrument.

As mentioned above, another advantage or feature of the present carrier gas distribution system is that one can easily install and remove channels by capping the carrier block, without having to reroute tubing for the carrier gas and vent conduits. For example, a channel cap plate can replace the channel adaptor. The channel cap plate is configured to mate with the carrier block when removing a channel. In some embodiments, the channel cap plate does not contain any passageway, though it can comprise one or more holes for clamping and the surface of the channel cap plate mates with the carrier block so as to seal or plug the carrier block carrier gas passageways exit(s) and carrier block vent passageway entrance(s). The channel cap plate can be configured to use the same clamping system as the channel adaptor.

Figure 4:
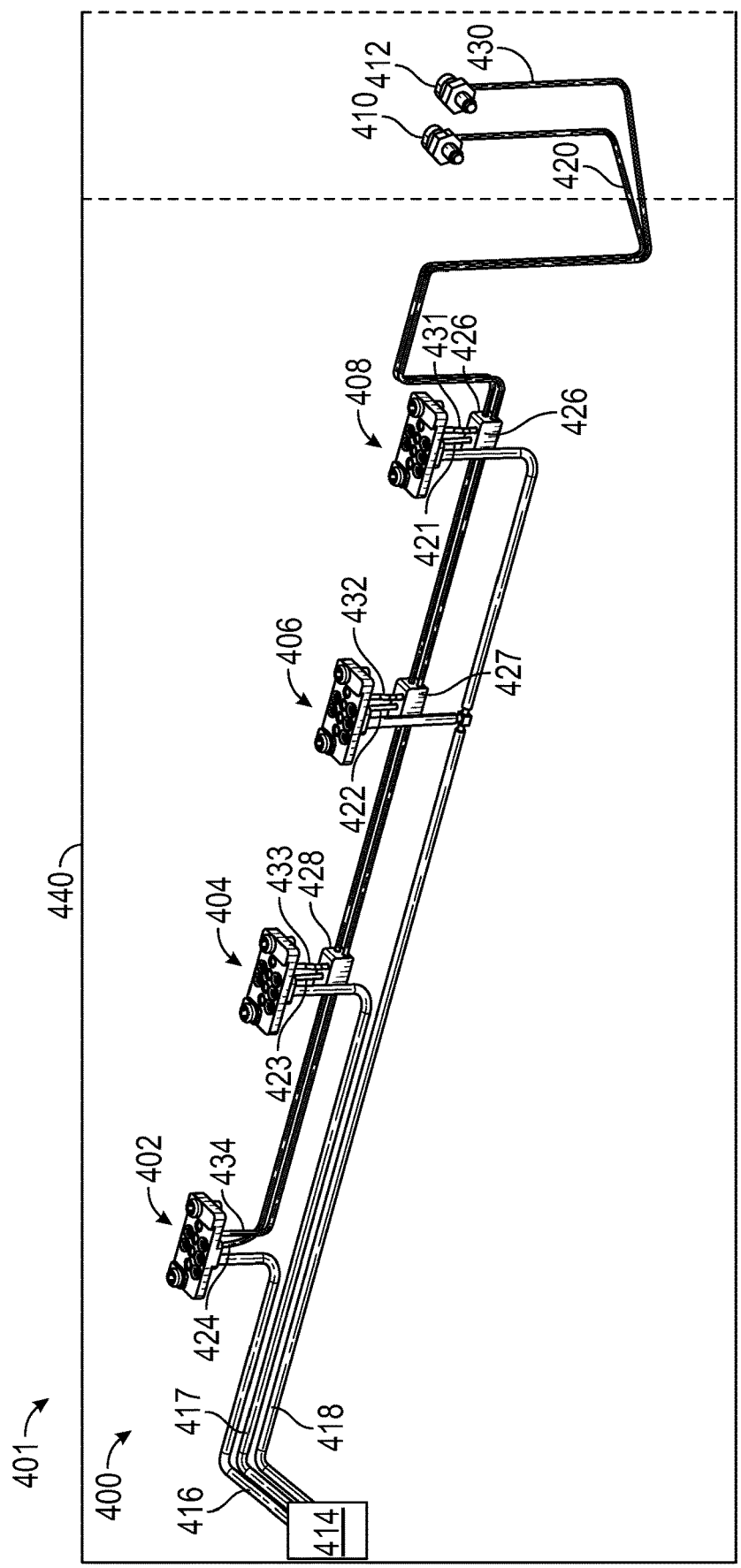
FIG. 4 shows an embodiment of a carrier gas and vent gas distribution system.

The present carrier gas connection devices can be included in a GC instrument having one or more GC channels for which it may be desirable to change carrier gases or have the ability to change carrier gases. The connection devices can be affixed to the GC instrument, such as by mounting the carrier blocks of the devices to a housing or case of the GC instrument. FIG. 4 shows an embodiment of a carrier gas and vent distribution system 400. The system 400 comprises four carrier gas connection devices 402, 404, 406, 408 (represented by four carrier blocks) as described herein. Each of the four carrier gas connection devices (or a larger or smaller number of such devices, such as 2, 3, 5, 6, 8, 12 or 16) is fluidically connected to a plurality of carrier gas sources. The system 400 is fluidically connected to a first carrier gas source 410 and a second carrier gas source 412. Fluidic connections are made in this embodiment by connecting conduits to sources 410, 412 and to carrier block carrier gas passageway entrances. A set of first carrier gas conduits 420, 421, 422, 423, 424 can be connected in series or in parallel to deliver carrier gas (e.g., a first carrier gas) to a plurality of carrier blocks from a single carrier gas source (e.g., a first carrier gas source.) Likewise, a set of second carrier gas conduits 430, 431, 432, 433, 434 can be connected in series or in parallel to deliver a second carrier gas to a plurality of carrier blocks from a single source of the second carrier gas. The carrier gas conduits may be fluidically connected at one or more conduit junctions 426, 427, 428. First carrier gas conduits 420, 421, 422, 423, and 424 are fluidically connected to each other at these junctions 426, 427, 428, and second carrier gas conduits 430, 431, 432, 433, and 434 are fluidically connected to each other at these junctions 426, 427, 428, but the first and second carrier gas conduits are not fluidically connected together.

The system 400 can also comprise a pump(s) 414 for pulling sample gas into a channel or other component of a GC instrument, such as an injector. Sample gas that has passed through the pump(s) 414 is typically considered waste which may be vented. In the present system 400, vent gas from the GC channel flows through vent conduits to channel adaptor vent passageway entrances, through the carrier block vent passageways into the vent conduits connected directly or indirectly to the pump(s). Thus, vented sample gas (that is, waste gas) can exit from the GC channel and be routed to the sample pump(s) to be expelled to waste or the atmosphere. Vent gas flows from a plurality of GC channels to a plurality of carrier gas connection devices 402, 404, 406, 408 and then to a pump module 414 through vent gas conduits 416, 417, 418. Pump module 414 comprises one or more sample pumps. Vent gas conduits from a plurality of carrier blocks can be connected to a pump for each GC channel, or, if the GC analysis allows, in series or in parallel to shared pumps, for example, if the sample amount and type of sample is being injected in multiple channels simultaneously and those channels are using the same carrier gas. For example, FIG. 4 depicts a a situation in which a first GC channel associated with device 402 uses a first pump, second and third GC channels associated with devices 406 and 408 share a second pump, and a fourth GC channel associated with device 404 can use either the first pump or the second pump in pump module 414. In some embodiments, each of the vent passageway exits of the carrier blocks of the carrier gas connection devices is fluidically connected to a single pump.

Figure 5:
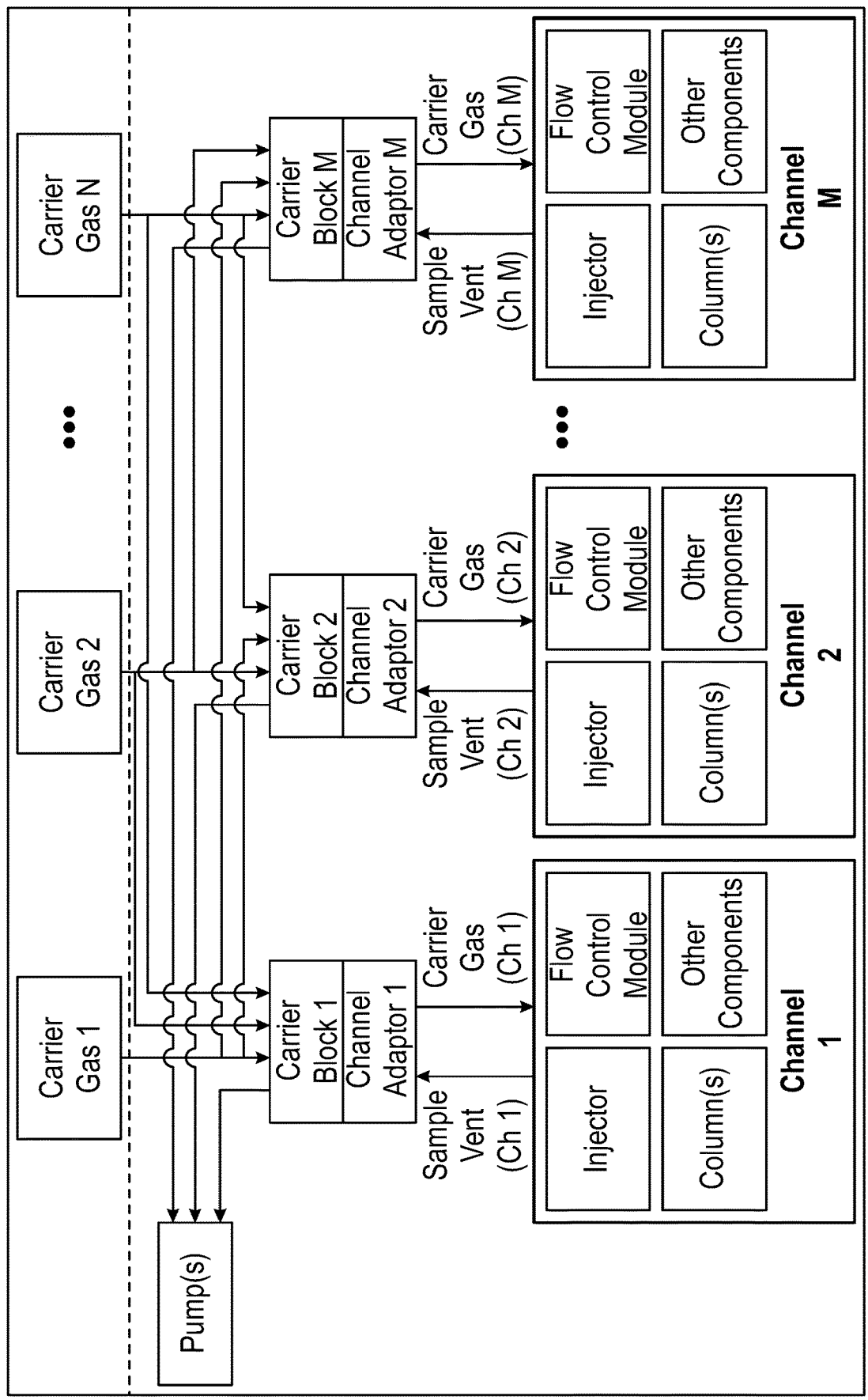
FIG. 5 shows an embodiment of a GC instrument employing a plurality of the carrier gas connection devices.

FIG. 5 shows an embodiment of a gas chromatography instrument comprising a number (M) of carrier gas connection devices as described herein. Each of the M carrier gas connection devices (where M can be 2, 3, 4, 5, 6, 8, 12 or 16 or a larger or smaller number of such devices) is fluidically connected to N carrier gas sources, and each of the carrier gas connection devices comprises N channel adaptor positions. Each of the carrier gas connection devices comprises a carrier block and a channel adaptor as described herein, and is fluidically connected to a GC channel. In this embodiment, each GC channel comprises a flow control module that controls the flow of carrier gas from the carrier gas connection device. The flow control module is connected to an injector. The injector traps a specific amount of sample and provides it to a GC column containing a stationary phase that separates the analytes, and exits through the detector which produces a signal indicative of the amount and type of analyte in the sample. Additionally, vent gas (which can be waste sample and/or carrier gas) from each GC channel can be routed out of the channel to the carrier gas connection device associated with that GC channel.

It is to be understood that the terminology used herein is for purposes of describing particular embodiments only and is not intended to be limiting. The defined terms are in addition to the technical and scientific meanings of the defined terms as commonly understood and accepted in the technical field of the present teachings.

The term "passageway" generally encompasses any structure configured to define a flow path for fluid to travel. A passageway typically has an entrance and an exit, though in some embodiments, a passageway can have multiple entrances and/or exits, such as where a passageway with two or more entrances converges or joins to one exit, or where a passageway with one entrance diverges or splits to two or more exits. For instance, a passageway may be a hole or set of holes in a block, or it may be a channel formed in a substrate by removing material from a substrate or by a combination of substrates, such as two or more layers bonded together, or a passageway may be a tube inside or outside another component. The geometry of a passageway may vary widely and includes circular, rectangular, square, D-shaped, trapezoidal or other polygonal cross-sections. A passageway may comprise varying geometries (e.g., rectangular cross-section at one section and trapezoidal cross-section at another section).

The term "conduit" generally encompasses any structure such as tubing that defines a flow path for fluid to travel from one point (e.g., an inlet of the conduit) to another point (e.g., an outlet of the conduit), though a conduit can deliver fluid to intermediate points as well. A conduit can be flexible, rigid, or both in some measure or portions. Typically a conduit is relatively long and/or linear and provides a flow path from one component (such as a carrier gas source) to another component (such as a block).

The term "block" generally encompasses any structure that comprises one or more passageways, such as by a channel formed in a block or a tube supported within the block. In some embodiments, a block comprises multiple passageways, whereby separate fluids may flow through the block. In some embodiments, a block comprises a manifold in communication with one or more interior flow paths and/or one or more external flow paths. The term "carrier block" generally refers to a structure configured to receive carrier gas into one or more passageways within the block and align passageway with another flow path, such as that of a channel adaptor. The carrier block may provide support for the channel adaptor and/or other components and may have features for affixing such components to the carrier block. In some embodiments, the carrier block comprises a first face or other surface configured to engage a channel adaptor, and a second face or surface opposite to the first face, wherein the second face is configured to engage one or more conduits, such as a conduit from a carrier gas source or a vent conduit. The first and second surfaces can be essentially parallel or at an angle to each other. The carrier block may also provide features to mount the connection device to or within an instrument.

The term "channel adaptor" generally encompasses any structure that comprises one or more passageways for a carrier gas to flow to a GC channel and which is configured for movement relative to a carrier block.

In the present disclosure, the terms "substantial" or "substantially" mean to within acceptable limits or degree to one having ordinary skill in the art. The terms "approximately" and "about" mean to within an acceptable limit or amount to one having ordinary skill in the art. The term "about" generally refers to plus or minus 15% of the indicated number. For example, "about 10" may indicate a range of 8.5 to 11.5. For example, "approximately the same" means that one of ordinary skill in the art considers the items being compared to be the same. When a ranges of values is set forth in the present disclosure, it should be understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described. All patents and publications referred to herein are expressly incorporated by reference.

As used in the specification and appended claims, the terms "a," "an," and "the" include both singular and plural referents, unless the context clearly dictates otherwise. Thus, for example, "a conduit" includes one conduit and plural conduits. Unless otherwise indicated, the terms "first", "second", "third", and other ordinal numbers are used herein to distinguish different elements of the present devices and methods, and are not intended to supply a numerical limit. Reference to first and second channel adaptor positions should not be interpreted to mean that the device only has two channel adaptor positions. A device having first and second element can also include a third, a fourth, a fifth, and so on, unless otherwise indicated.

Exemplary Embodiments

Exemplary embodiments provided in accordance with the presently disclosed subject matter include, but are not limited to, the following:

Embodiment 1. A carrier gas connection device comprising: a carrier block comprising first and second carrier block carrier gas passageways, and each of the carrier block carrier gas passageways comprises an entrance and exit; a channel adaptor comprising a channel adaptor carrier gas passageway having an entrance and an exit; and a clamping system that fastens the carrier block to the channel adaptor in a substantially fluid-tight connection. The carrier gas connection device comprises first and second channel adaptor positions (and can further include third, fourth or more channel adaptor positions). (i) In the first channel adaptor position, the channel adaptor carrier gas passageway entrance aligns with the first carrier block carrier gas passageway exit to form a fluid-tight flow path for a first carrier gas out of the carrier block into the channel adaptor. (ii) In the second channel adaptor position, the channel adaptor carrier gas passageway entrance aligns with the second carrier block carrier gas passageway exit to form a fluid-tight flow path for a second carrier gas out of the carrier block into the channel adaptor.

Embodiment 2. The carrier gas connection device of embodiment 1, wherein the channel adaptor is configured for switching from one of the channel adaptor positions to another of the channel adaptor positions by manual movement.

Embodiment 3. The carrier gas connection device of embodiment 1 or 2, wherein the channel adaptor comprises one or more sealing surfaces configured to form a fluid-tight plug of one or more unused carrier block carrier gas passageway exits. In some embodiments, in the first channel adaptor position, one or more of those sealing surfaces plugs the second carrier block carrier gas passageway exit, and in the second channel adaptor position, one or more of those sealing surfaces plugs the first carrier block carrier gas passageway exit.

Embodiment 4. The carrier gas connection device of any of embodiments 1 to 3, wherein the channel adaptor further comprises: a channel adaptor vent passageway having an entrance and two or more exits, and the carrier block comprises a carrier block vent passageway having an entrance and an exit; or a channel adaptor vent passageway having an entrance and an exit, and the carrier block comprises a carrier block vent passageway having two or more entrances and an exit.

Embodiment 5. The carrier gas connection device of embodiment 4, wherein the first and second carrier block carrier gas passageways are spaced at distance D1, and the channel adaptor vent passageway comprises at least two exits, and the at least two channel adaptor vent passageway exits are spaced at distance D2, and D2 is substantially equal to D1.

Embodiment 6. The carrier gas connection device of embodiment 4, wherein the channel adaptor comprises one channel adaptor vent passageway entrance and at least two channel adaptor vent passageway exits, and the carrier block comprises one carrier block vent passageway entrance and one or more sealing surfaces configured to form a fluid-tight plug of one or more unused channel adaptor vent passageway exits.

Embodiment 7. The carrier gas connection device of embodiment 4, wherein the channel adaptor comprises one channel adaptor vent passageway exit and the carrier block comprises at least two carrier block vent passageway entrances and one carrier block vent passageway exit, and the channel adaptor further comprises one or more sealing surfaces configured to form a fluid-tight plug of one or more unused carrier block vent passageway entrances.

Embodiment 8. The carrier gas connection device of any of embodiments 1 to 7, wherein the clamping system comprises: at least one fastener or alignment feature; at least one hole in the channel adaptor; and at least two holes in the carrier block. The channel adaptor hole and the carrier block holes are configured to receive the fastener or the alignment feature. The channel adaptor hole is aligned with a first carrier block hole in the first channel adaptor position, and the channel adaptor hole is aligned with a second carrier block hole in the second channel adaptor position.

Embodiment 9. The carrier gas connection device of embodiment 8, wherein the clamping system comprises at least two sets of holes in the carrier block, and each set is offset by a distance D3 from the other set.

Embodiment 10. The carrier gas connection device of embodiment 9, wherein the first and second carrier block carrier gas passageway exits are spaced at distance D1, and D3 is substantially equal to D1

Embodiment 11. The carrier gas connection device of embodiment 4, wherein the channel adaptor vent passageway entrance is fluidically connected directly or indirectly to one or more pumps, wherein the one or more pumps are fluidically connected directly or indirectly to the channel adaptor carrier gas passageway exit.

Embodiment 12. The carrier gas connection device of any of embodiments 1 to 11, wherein the carrier block comprises a recess around each of the carrier block carrier gas passageway exits, and each of the recesses comprises compliant seal material located to aid in formation of a fluid-tight seal.

Embodiment 13. A carrier gas distribution system comprising a plurality of carrier gas connection devices according to any of embodiments 1 to 12. The plurality comprises a first carrier gas connection device and a second carrier gas connection device (and can further comprise third, fourth, fifth or more devices), and the first carrier block carrier gas passageway of each of the first and second carrier gas connection devices is fluidically connected to a single first carrier gas source.

Embodiment 14. The system of embodiment 13, wherein the second carrier block carrier gas passageway of each of the first and second carrier gas connection devices is fluidically connected to a single second carrier gas source.

Embodiment 15. A gas chromatography instrument comprising a gas chromatography channel, and the GC channel is fluidically connected directly or indirectly to the carrier gas connection device of any of embodiments 1 to 12.

Embodiment 16. The gas chromatography instrument of embodiment 15, wherein GC channel is fluidically connected to the channel adaptor of the carrier gas connection device.

Embodiment 17. The gas chromatography instrument of embodiment 15 or 16, wherein the GC instrument comprises at least four GC channels, and each of the GC channels is fluidically connected to a different one of the carrier gas connection devices.

Embodiment 18. The gas chromatography instrument of any of embodiments 15 to 17, wherein the GC instrument is a micro GC.

Embodiment 19. A method of changing a carrier gas supplied to a GC comprising: operating a GC instrument according to any of embodiments 15 to 18 by supplying a first carrier gas to the GC channel, wherein the first carrier gas flows through a carrier gas passageway of a channel adaptor fluidically connected directly or indirectly to the GC channel; moving the channel adaptor from the first channel adaptor position to the second channel adaptor position; supplying a second carrier gas to the GC channel, wherein the second carrier gas flows through the carrier gas passageway of the channel adaptor directly or indirectly to the GC channel.

Embodiment 20. The method of embodiment 19, wherein clamping the channel adaptor in the second channel adaptor position simultaneously forms: a fluid-tight connection between the second carrier block carrier gas passageway and the channel adaptor carrier gas passageway, and a fluid-tight plug of the first carrier gas passageway of the carrier block by a sealing surface of the channel adaptor, whereby flow of the first carrier gas out of the first carrier gas passageway is stopped.

The foregoing description of exemplary or preferred embodiments should be taken as illustrating, rather than as limiting the present invention as defined by the embodiments. As will be readily appreciated, numerous variations and combinations of the features set forth above can be utilized without departing from the present invention as set forth in the embodiments. Such variations are not regarded as a departure from the scope of the invention, and all such variations are intended to be included within the scope of the following embodiments. All references cited herein are incorporated by reference in their entireties.

We claim:

1. A carrier gas connection device comprising:
   a carrier block comprising first and second carrier block carrier gas passageways formed in the carrier block, and each of the carrier block carrier gas passageways comprises an entrance and exit;
   a channel adaptor comprising a channel adaptor carrier gas passageway having an entrance and an exit;
   a clamping system that fastens the carrier block to the channel adaptor in a substantially fluid-tight connection; and
   the carrier gas connection device comprises first and second channel adaptor positions wherein:
   (i) in the first channel adaptor position, the channel adaptor carrier gas passageway entrance aligns with the first carrier block carrier gas passageway exit to form a fluid-tight flow path for a first carrier gas out of the carrier block into the channel adaptor, and
   (ii) in the second channel adaptor position, the channel adaptor carrier gas passageway entrance aligns with the second carrier block carrier gas passageway exit to form a fluid-tight flow path for a second carrier gas out of the carrier block into the channel adaptor.

2. The carrier gas connection device of claim 1, wherein the channel adaptor is configured for switching from one of the channel adaptor positions to another of the channel adaptor positions by manual movement.

3. The carrier gas connection device of claim 1, wherein the channel adaptor comprises one or more sealing surfaces configured to form a fluid-tight plug of one or more unused carrier block carrier gas passageway exits, wherein:
   (i) in the first channel adaptor position, said one or more sealing surfaces plugs the second carrier block carrier gas passageway exit, and
   (ii) in the second channel adaptor position, said one or more sealing surfaces plugs the first carrier block carrier gas passageway exit.

4. The carrier gas connection device of claim 1, wherein the channel adaptor further comprises:
   a channel adaptor vent passageway having an entrance and two or more exits, and the carrier block comprises a carrier block vent passageway having an entrance and an exit; or
   a channel adaptor vent passageway having an entrance and an exit, and the carrier block comprises a carrier block vent passageway having two or more entrances and an exit.

5. The carrier gas connection device of claim 4, wherein the first and second carrier block carrier gas passageways are spaced at distance D1, and
   the channel adaptor vent passageway comprises at least two exits, and the at least two channel adaptor vent passageway exits are spaced at distance D2, and D2 is substantially equal to D1.

6. The carrier gas connection device of claim 4, wherein the channel adaptor comprises one channel adaptor vent passageway entrance and at least two channel adaptor vent passageway exits, and the carrier block comprises one carrier block vent passageway entrance and one or more sealing surfaces configured to form a fluid-tight plug of one or more unused channel adaptor vent passageway exits.

7. The carrier gas connection device of claim 4, wherein the channel adaptor comprises one channel adaptor vent passageway exit and the carrier block comprises at least two carrier block vent passageway entrances and one carrier block vent passageway exit, and the channel adaptor further comprises one or more sealing surfaces configured to form a fluid-tight plug of one or more unused carrier block vent passageway entrances.

8. The carrier gas connection device of claim 4, wherein the channel adaptor vent passageway entrance is fluidically connected directly or indirectly to a gas chromatography (GC) channel, wherein one or more pumps are fluidically connected directly or indirectly to the channel adaptor carrier gas passageway exit.

9. The carrier gas connection device of claim 1, wherein the carrier block comprises a recess around each of the carrier block carrier gas passageway exits, and each of the recesses comprises compliant seal material located to aid in formation of a fluid-tight seal.

10. A carrier gas distribution system comprising a plurality of carrier gas connection devices according to claim 1, wherein the plurality comprises a first carrier gas connection device and a second carrier gas connection device, and
   the first carrier block carrier gas passageway of each of the first and second carrier gas connection devices is fluidically connected to a single first carrier gas source.

11. The system of claim 10, wherein the second carrier block carrier gas passageway of each of the first and second carrier gas connection devices is fluidically connected to a single second carrier gas source.

12. A gas chromatography instrument comprising a gas chromatography (GC) channel, and the GC channel is fluidically connected directly or indirectly to the carrier gas connection device of claim 1.

13. The gas chromatography instrument of claim 12, wherein gas chromatography (GC) channel is fluidically connected to the channel adaptor of the carrier gas connection device.

14. The gas chromatography instrument of claim 12, wherein the gas chromatography (GC) instrument comprises at least four GC channels, and each of the GC channels is fluidically connected to a different one of the carrier gas connection devices.

15. The gas chromatography instrument of claim 12, wherein the gas chromatography (GC) instrument is a micro GC.

16. A method of changing a carrier gas supplied to a gas chromatography (GC) comprising:
   operating a gas chromatography (GC) instrument according to claim 15 by supplying a first carrier gas to the GC channel, wherein the first carrier gas flows through a carrier gas passageway of a channel adaptor fluidically connected directly or indirectly to the GC channel;
   moving the channel adaptor from the first channel adaptor position to the second channel adaptor position; and
   supplying a second carrier gas to the GC channel, wherein the second carrier gas flows through the carrier gas passageway of the channel adaptor directly or indirectly to the GC channel.

17. The method of claim 16, wherein clamping the channel adaptor in the second channel adaptor position simultaneously forms:
   a fluid-tight connection between the second carrier block carrier gas passageway and the channel adaptor carrier gas passageway, and
   a fluid-tight plug of the first carrier gas passageway of the carrier block by a sealing surface of the channel adaptor, whereby flow of the first carrier gas out of the first carrier gas passageway is stopped.

18. A carrier gas connection device comprising:
   a carrier block comprising first and second carrier block carrier gas passageways, and each of the carrier block carrier gas passageways comprises an entrance and exit;
   a channel adaptor comprising a channel adaptor carrier gas passageway having an entrance and an exit;
   a clamping system that fastens the carrier block to the channel adaptor in a substantially fluid-tight connection; wherein the clamping system comprises:
   at least one fastener or alignment feature;
   at least one hole in the channel adaptor; and
   at least two holes in the carrier block;
   wherein the channel adaptor hole and the carrier block holes are configured to receive the fastener or the alignment feature; and
   wherein the channel adaptor hole is aligned with a first carrier block hole in the first channel adaptor position, and the channel adaptor hole is aligned with a second carrier block hole in the second channel adaptor position; and
   the carrier gas connection device comprises first and second channel adaptor positions wherein:
   (i) in the first channel adaptor position, the channel adaptor carrier gas passageway entrance aligns with the first carrier block carrier gas passageway exit to form a fluid-tight flow path for a first carrier gas out of the carrier block into the channel adaptor, and (ii) in the second channel adaptor position, the channel adaptor carrier gas passageway entrance aligns with the second carrier block carrier gas passageway exit to form a fluid-tight flow path for a second carrier gas out of the carrier block into the channel adaptor.

19. The carrier gas connection device of claim 18, wherein the clamping system comprises at least two sets of holes in the carrier block, and each set is offset by a distance D3 from the other set.

20. The carrier gas connection device of claim 19, wherein the first and second carrier block carrier gas passageway exits are spaced at distance D1, and D3 is substantially equal to D1.

* * * * *